(12) United States Patent
Kumar et al.

(10) Patent No.: US 11,057,861 B2
(45) Date of Patent: Jul. 6, 2021

(54) NAVIGATION AND POSITIONING SYSTEM USING RADIO BEAM SUPPORT INFORMATION

(71) Applicant: QUALCOMM Incorporated, San Diego, CA (US)

(72) Inventors: Akash Kumar, Hyderabad (IN); Stephen William Edge, Escondido, CA (US); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/509,500

(22) Filed: Jul. 12, 2019

(65) Prior Publication Data
US 2020/0137714 A1 Apr. 30, 2020

(30) Foreign Application Priority Data
Oct. 31, 2018 (IN) .............................. 201841041176

(51) Int. Cl.
*H04W 64/00* (2009.01)
*H04W 48/08* (2009.01)
*H04W 72/04* (2009.01)
*H04W 4/024* (2018.01)
*H04W 72/08* (2009.01)

(52) U.S. Cl.
CPC ......... *H04W 64/006* (2013.01); *H04W 4/024* (2018.02); *H04W 48/08* (2013.01); *H04W 72/046* (2013.01); *H04W 72/048* (2013.01); *H04W 72/085* (2013.01)

(58) Field of Classification Search
CPC . H04W 64/006; H04W 64/003; H04W 4/024; H04W 48/08; H04W 72/046; H04W 72/048
See application file for complete search history.

(56) References Cited

U.S. PATENT DOCUMENTS

| | | | |
|---|---|---|---|
| 7,123,924 | B2 | 10/2006 | Cuffaro |
| 8,565,689 | B1 | 10/2013 | Rubin et al. |
| 10,517,061 | B1 | 12/2019 | Kumar et al. |
| 10,812,238 | B2 | 10/2020 | Zhang et al. |

(Continued)

OTHER PUBLICATIONS

International Search Report and Written Opinion—PCT/US2019/055767—ISA/EPO—filed Jan. 23, 2020.

*Primary Examiner* — Myron Wyche

(57) ABSTRACT

Methods and systems for wireless communication are provided. In one example, a mobile device is configured to: obtain beam support information of a plurality of cells; perform measurements of one or more signals at the mobile device based on the beam support information of the plurality of cells to support a location determination operation for the mobile device; and transmit results of the measurements of the one or more signals to at least one of a location server or to a base station to support the location determination operation. The beam support information may include: a number of beams supported at each cell of the plurality of cells, information to identify each beam of the number of beams supported at the each cell, beam width information of the each beam, and/or Positioning reference Signals (PRS) codebook information which encapsulates the beams which are enabled along various elevation and azimuth angles.

31 Claims, 21 Drawing Sheets

(56) References Cited

U.S. PATENT DOCUMENTS

| | | | |
|---|---|---|---|
| 2014/0066094 A1 | 3/2014 | Siomina et al. | |
| 2015/0249934 A1* | 9/2015 | Siomina | H04W 24/00 370/252 |
| 2016/0191201 A1* | 6/2016 | Park | H04B 7/0639 370/252 |
| 2017/0142682 A1* | 5/2017 | Gunnarsson | G01S 5/0289 |
| 2019/0173533 A1* | 6/2019 | Kim | H04W 76/27 |
| 2020/0128506 A1* | 4/2020 | Zhang | G01S 5/14 |

* cited by examiner

| IE/Group Name | Presence | Range | IE type and reference |
|---|---|---|---|
| Message Type | M | | 9.2.3 |
| NRPPa Transaction ID | M | | 9.2.4 |
| LMF Measurement ID | M | | INTEGER(1..15,...) |
| Report Characteristics | M | | ENUMERATED(OnDemand, Periodic,....) |
| Measurement Periodicity | C-ifReportCharacteristicsPeriodic | | ENUMERATED(120ms, 240ms, 480ms, 640ms, 1024ms, 2048ms, 5120ms, 10240ms, 1min, 6min, 12min, 30min, 60min,....) |
| Measurement Quantities | | 1 .. <maxnoMeas> | |
| Actual Beam support | M/O | 1:64 | Value (6 Bits) |
| >Measurement Quantities Item | M | | ENUMERATED ( Cell-ID, {Beam ID}, 0 - <maxnomeas> Angle of Arrival, Timing Advance Type 1, Timing Advance Type 2, RSRP/RSRQ, Mean Angle Per Receive Beam (O) RSRP/RSRQ per Beam ID, Beam Width Per Beam ID ) |
| Inter-RAT Measurement Quantities | | 0 .. <maxnoMeas> | |
| >Inter-RAT Measurement Quantities Item | M | | ENUMERATED(GERAN, UTRAN,....) |
| WLAN Measurement Quantities | | 0 .. <maxnoMeas> | |
| >WLAN Measurement Quantities Item | M | | ENUMERATED (WLAN, ...) |

FIG. 6B

| IE/Group Name | Presence | Range | IE type and reference |
|---|---|---|---|
| OTDOA Cell Information | | | |
| >CHOICE OTDOA Cell Information Item | M | 1 .. <maxnoOTDOAtypes> | |
| >>PCI | M | | INTEGER (0..503,...) |
| >>Cell ID | M | | ECGI |
| >>Actual Beam Support | M | | INTEGER(1,2..64) |
| >>EARFCN | M | | INTEGER (0..65535,..., 65536..262143) |
| >>PRS Bandwidth | M | | ENUMERATED (bw6, bw15, bw25, bw50, bw75, bw100, ...) |
| >>PRS Configuration Index | M | | INTEGER (0..4095,...) |
| >>CP Length | M | | ENUMERATED (Normal, Extended,...) |
| >>Number of DL Frames | M | | ENUMERATED (sf1, sf2, sf4, sf6,...) |
| >>Number of Antenna Ports | M | | ENUMERATED(n1-or-n2, n4,...) |
| >>SFN Initialisation Time | M | | BIT STRING (64) |
| >>NG-RAN Access Point Position | M | | 9.2.10 |
| >>PRS Muting Configuration | M | | 9.2.16 |
| >>PRS-ID | M | | INTEGER (0..4095,...) |
| >>TP-ID | M | | INTEGER (0..4095,...) |
| >>TP Type | M | | ENUMERATED (prs-only-tp,...) |

FIG. 6C

650 —↗ totalNumberOfRA-Preambles 10,
ssb-perRACH-OccasionAndCB-PreamblesPerSSB sixteen : 3,
ra-ContentionResolutionTimer sf64,
prach-RootSequenceIndex l139 : 0,
msg1-SubcarrierSpacing kHz120,
restrictedSetConfig unrestrictedSet
},
pusch-ConfigCommon setup :
{
  pusch-AllocationList
  {
    {
      k2 4,
      mappingType typeA,
      startSymbolAndLength '0011011'B
    },
    {
      k2 4,
      mappingType typeA,
      startSymbolAndLength '0011011'B
    },
  },
  msg3-DeltaPreamble 2,
  p0-NominalWithGrant 0
}, 652 —↗ ssb-PositionsInBurst longBitmap : '1111111111111111 1111111111111111 1111111111111111 1111111111111111'B //64 beam support, ssb-periodicityServingCell ms20,
dmrs-TypeA-Position pos2,
subcarrierSpacing kHz120,
ss-PBCH-BlockPower 20
},
newUE-Identity 32768,
t304 ms1000

FIG. 6D

NAVIGATION AND POSITIONING SYSTEM USING RADIO BEAM SUPPORT INFORMATION

CROSS-REFERENCE TO RELATED APPLICATIONS

The present application claims the benefit and priority of Indian Provisional Application No. 201841041176, filed Oct. 31, 2018, entitled "Navigation and Positioning System Using Radio Beam Support Information". The contents of Indian Provisional Application No. 201841041176 is incorporated herein by reference in its entirety for all purposes.

BACKGROUND

1. Field

The subject matter disclosed herein relates to electronic devices, and more particularly to methods and apparatuses for use to support location determination of a mobile device using a fifth-generation (5G) wireless network.

2. Information

Obtaining the location of a mobile device that is accessing a wireless network may be useful for many applications including, for example, emergency calls, personal navigation, asset tracking, locating a friend or family member, etc. Existing location methods include methods based on measuring the timing of radio signals received from a variety of devices including, for example, satellite vehicles (SVs), terrestrial radio sources (e.g., a base station), etc. in a multiple-access wireless network. Examples of such multiple-access networks include Code Division Multiple Access (CDMA) networks, Time Division Multiple Access (TDMA) networks, Frequency Division Multiple Access (FDMA) networks, etc. A FDMA network may include, for example, Orthogonal FDMA (OFDMA) networks, Single-Carrier FDMA (SC-FDMA) networks, etc. It is expected that standardization for new fifth-generation (5G) wireless networks will include support for various positioning methods, both new and existing, such as Observed Time Difference Of Arrival (OTDOA), Enhanced Cell ID (E-CID), among others.

A base station in a 5G network can transmit signals to support various positioning methods using multiple directional radio beams. Various attributes of the radio beams, such as beam widths, can affect the accuracy of the positioning operations. Embodiments disclosed herein enable positioning operations to be adapted according to the attributes of the radio beams transmitted by different base stations, to improve the accuracy of positioning operations in 5G wireless networks.

SUMMARY

The present disclosure provides a method for wireless communication, the method being performed by a location server and comprising: obtaining beam support information of a plurality of cells; configuring a location determination operation for a mobile device based on the beam support information of the plurality of cells, the location determination operation comprising measurements of one or more signals to be performed by at least one of the mobile device or one or more cells of the plurality of cells; receiving results of the measurements of the one or more signals; and determining a location of the mobile device based on the results of the measurements of the one or more signals.

In some aspects, the beam support information comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles.

In some aspects, the information to identify each beam of the number of beams supported at the each cell comprises a bitmap. Each bit of the bitmap corresponds to a beam, and a value of the each bit indicates whether the beam is supported at the each cell.

In some aspects, the method further comprises transmitting a query to each base station of each cell of the plurality of cells to request the beam support information. The beam support information is obtained after the query is transmitted. In some examples, the query is transmitted under New Radio Location Protocol A (NRPPa) protocol.

In some aspects, the method further comprises transmitting an information request to each base station of each cell of the plurality of cells, the information request including a list of information items, one of the list of information items including the beam support information. The beam support information is obtained after the information request is transmitted. The information request may be included in at least one of: an Enhanced Cell ID (E-CID) measurement initiation request message, or an Observed Time Difference Of Arrival (OTDOA) information request message. The information request can be transmitted under NRPPa protocol.

In some aspects, the beam support information is not obtained from base stations of the plurality of cells. Instead, the beam support information is obtained from at least one of: a maintenance operation of the location server, or a programming operation of the location server.

In some aspects, configuring the location determination operation for the mobile device comprises: generating configuration data based on the beam support information; and transmitting the configuration data to the mobile device, to enable the mobile device to perform the measurements of one or more signals with a subset of cells of the plurality of cells for the location determination operation. The configuration data may include Assistance Data.

In some aspects, the method further comprises: ranking the subset of cells based on number of beams supported at the each cell included in the beam support information. The subset of cells supports highest numbers of beams among the plurality of cells.

In some aspects, the method further comprises ranking the subset of cells based on beam width of the beams supported at the each cell included in the beam support information. The subset of cells supports narrowest beams among the plurality of cells.

In some aspects, the configuration data includes information of the subset of cells. In some examples, the configuration data includes the beam support information of each cell of the plurality of cells. In some examples, the measurements of one or more signals comprise at least one of: measurements of Positioning Reference Signals (PRS), measurements of Reference Signal Received Power (RSRP), measurements of Reference Signal Received Quality (RSRQ), Timing Advance, or Angle of Arrival (AoA).

In some aspects, configuring the location determination operation for the mobile device comprises: selecting, based on the beam support information, a subset of cells of the plurality of cells; and transmitting a signal measurement request to the subset of cells to initiate the location determination operation at the subset of cells. The signal measurement request comprises at least one of: an E-CID measurement initiation request message, or an OTDOA information request message.

In some aspects, configuring the location determination operation for the mobile device comprises: selecting, based on the beam support information, a subset of cells of the plurality of cells; and updating a schedule of PRS transmission at the subset of cells. Updating a schedule of PRS transmission at the subset of cells comprises at least one of: updating a duration of each PRS signal, updating a period between the each PRS signal, or updating a bandwidth allocated for the each PRS signal.

The present disclosure also provides a location server configured to perform the method for the wireless communication as described above. The location server may include a processor to execute a set of instructions stored in a non-transitory computer readable medium to perform the method for the wireless communication as described above.

The present disclosure also provides a method for wireless communication, the method being performed by a mobile device, the method comprising: obtaining beam support information of a plurality of cells; performing measurements of one or more signals at the mobile device based on the beam support information of the plurality of cells to support a location determination operation for the mobile device; and transmitting results of the measurements of the one or more signals to at least one of a location server or a base station to support the location determination operation.

In some aspects, the beam support information comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles.

In some aspects, the information to identify each beam of the number of beams supported at the each cell comprises a bitmap. Each bit of the bitmap corresponds to a beam. A value of the each bit indicates whether the beam is supported at the each cell.

In some aspects, the beam support information is obtained from configuration data provided from a location server. The configuration data may include a subset of the plurality of cells which support beams that are targeted at a location of the mobile device. In some examples, the beam support information is obtained from base stations of the plurality of cells. The beam support information is obtained via at least one of: Radio Resource Control (RRC) Reconfiguration messages from the plurality of cells, or System Information Block Type 1 (SIB1) messages from the plurality of cells.

In some aspects, performing measurements of one or more signals at the mobile device based on the beam support information of the plurality of cells comprises: selecting, based on the beam support information, a subset of cells of the plurality of cells; and performing the measurements with the subset of cells. The measurements of the one or more signals comprise at least one of: measurements of Positioning Reference Signals (PRS), measurements of Reference Signal Received Power (RSRP), or measurements of Reference Signal Received Quality (RSRQ).

In some aspects, performing measurements of one or more signals at the mobile device based on the beam support information of the plurality of cells comprises: selecting, based on the beam support information, a subset of cells of the plurality of cells; and transmitting a request to the subset of cells to update a schedule of PRS transmission at the subset of cells. In some examples, updating a schedule of PRS transmission at the subset of cells comprises at least one of: updating a duration of each PRS signal, updating a period between the each PRS signal, or updating a bandwidth allocated for the each PRS signal.

The present disclosure also provides a mobile device, such as a User Equipment (UE), configured to perform the method for the wireless communication as described above. The UE may include a processor to execute a set of instructions stored in a non-transitory computer readable medium to: obtain beam support information of a plurality of cells; perform measurements of one or more signals at the mobile device based on the beam support information of the plurality of cells to support a location determination operation for the mobile device; and transmit results of the measurements of the one or more signals to at least one of a location server or to a base station to support the location determination operation.

In some aspects, the beam support information comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles.

In some aspects, the information to identify each beam of the number of beams supported at the each cell comprises a bitmap. Each bit of the bitmap corresponds to a beam. A value of the each bit indicates whether the beam is supported at the each cell.

In some aspects, the beam support information is obtained from configuration data provided from the location server.

In some aspects, the configuration data identifies a subset of cells of the plurality of cells which support beams that are targeted at a location of the mobile device. The configuration data further includes information of the subset of cells.

In some aspects, the configuration data includes the beam support information of each cell of the plurality of cells. The configuration data may include Assistance Data.

In some aspects, the beam support information is obtained from base stations of the plurality of cells. The beam support information can be obtained by the location server from the base stations based on a query transmitted under New Radio Location Protocol A (NRPPa) protocol. The beam support information can be obtained by the location server from the base stations based on an information request.

In some aspects, the information request includes a list of information items, one of the list of information items including the beam support information.

In some aspects, the beam support information is obtained from at least one of: a maintenance operation of the location server, or a programming operation of the location server.

In some aspects, the beam support information is obtained via at least one of: Radio Resource Control (RRC) Reconfiguration messages from the plurality of cells, or System Information Block Type 1 (SIB1) messages from the plurality of cells.

In some aspects, the hardware processor is configured to execute the set of instructions to: select, based on the beam support information, a subset of cells of the plurality of cells; and perform the measurements of the one or more signals with the subset of cells.

In some aspects, the measurements of the one or more signals comprise at least one of: measurements of Positioning Reference Signals (PRS), measurements of Reference Signal Received Power (RSRP), measurements of Reference Signal Received Quality (RSRQ), Timing Advance, or Angle of Arrival (AoA).

In some aspects, the hardware processor is configured to execute the set of instructions to: select, based on the beam support information, a subset of cells of the plurality of cells; and transmit a request to the subset of cells to update a schedule of PRS transmission at the subset of cells. The updating a schedule of PRS transmission at the subset of cells comprises at least one of: updating a duration of each PRS signal, updating a period between the each PRS signal, or updating a bandwidth allocated for the each PRS signal. In some aspects, the subset of cells supports a highest number of beams among the plurality of cells. In some aspects, the subset of cells supports narrowest beams among the plurality of cells.

The present disclosure also provides a method of wireless communication. The method comprises: obtaining, by a mobile device, beam support information of a plurality of cells; performing, by the mobile device, measurements of one or more signals at the mobile device based on the beam support information of the plurality of cells to support a location determination operation for the mobile device; and transmitting, by the mobile device, results of the measurements of the one or more signals to at least one of a location server or to a base station to support the location determination operation.

In some aspects, the beam support information comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles. In some aspects, the information to identify each beam of the number of beams supported at the each cell comprises a bitmap. Each bit of the bitmap corresponds to a beam. A value of the each bit indicates whether the beam is supported at the each cell.

In some aspects, the beam support information is obtained from configuration data provided from the location server.

In some aspects, the configuration data identifies a subset of cells of the plurality of cells which support beams that are targeted at a location of the mobile device. In some aspects, the subset of cells supports a highest number of beams among the plurality of cells. In some aspects, the subset of cells supports narrowest beams among the plurality of cells.

In some aspects, the beam support information is obtained via at least one of: Radio Resource Control (RRC) Reconfiguration messages from the plurality of cells, or System Information Block Type 1 (SIB1) messages from the plurality of cells.

In some aspects, the measurements of the one or more signals comprise at least one of: measurements of Positioning Reference Signals (PRS), measurements of Reference Signal Received Power (RSRP), measurements of Reference Signal Received Quality (RSRQ), Timing Advance, or Angle of Arrival (AoA).

In some aspects, the method further comprises: selecting, by the mobile device and based on the beam support information, a subset of cells of the plurality of cells; and transmitting, by the mobile device, a request to the subset of cells to update a schedule of PRS transmission at the subset of cells. The updating a schedule of PRS transmission at the subset of cells comprises at least one of: updating a duration of each PRS signal, updating a period between the each PRS signal, or updating a bandwidth allocated for the each PRS signal.

The present disclosure also provides a non-transitory computer-readable medium storing instructions that, when executed by a hardware processor of a mobile device, cause the mobile device to: obtain beam support information of a plurality of cells, perform measurements of one or more signals at the mobile device based on the beam support information of the plurality of cells to support a location determination operation for the mobile device, and transmit results of the measurements of the one or more signals to at least one of a location server or to a base station to support the location determination operation.

In some aspects, the beam support information comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles. The information to identify each beam of the number of beams supported at the each cell comprises a bitmap. Each bit of the bitmap corresponds to a beam. A value of the each bit indicates whether the beam is supported at the each cell.

In some aspects, the beam support information is obtained from configuration data provided from the location server. The beam support information can be obtained via at least one of: Radio Resource Control (RRC) Reconfiguration messages from the plurality of cells, or System Information Block Type 1 (SIB1) messages from the plurality of cells.

In some aspects, the non-transitory computer readable medium further comprises instructions that, when executed by the hardware processor, cause the mobile device to: select, based on the beam support information, a subset of cells of the plurality of cells; and perform the measurements of the one or more signals with the subset of cells. The subset of cells supports a highest number of beams or narrowest beams among the plurality of cells.

In some aspects, the measurements of the one or more signals comprise at least one of: measurements of Positioning Reference Signals (PRS), measurements of Reference Signal Received Power (RSRP), measurements of Reference Signal Received Quality (RSRQ), Timing Advance, or Angle of Arrival (AoA).

In some aspects, the non-transitory computer readable medium further comprises instructions that, when executed by the hardware processor, causes the mobile device to: select, and based on the beam support information, a subset of cells of the plurality of cells; and transmit a request to the subset of cells to update a schedule of PRS transmission at the subset of cells. The updating a schedule of PRS transmission at the subset of cells comprises at least one of: updating a duration of each PRS signal, updating a period between the each PRS signal, or updating a bandwidth allocated for the each PRS signal.

The present disclosure also provides an apparatus. The apparatus comprises: means for obtaining beam support information of a plurality of cells; means for performing measurements of one or more signals at the apparatus based on the beam support information of the plurality of cells to support a location determination operation for the apparatus;

and means for transmitting results of the measurements of the one or more signals to at least one of a location server or to a base station to support the location determination operation.

In some aspects, the beam support information comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles.

BRIEF DESCRIPTION OF DRAWINGS

Non-limiting and non-exhaustive aspects are described with reference to the following figures.

FIGS. 6A, 6B, 6C, and 6D represent an example of a communication system that utilizes radio beam support information to support location determination operation, as well as examples of the radio beam information, according to some embodiments.

Figure 1:
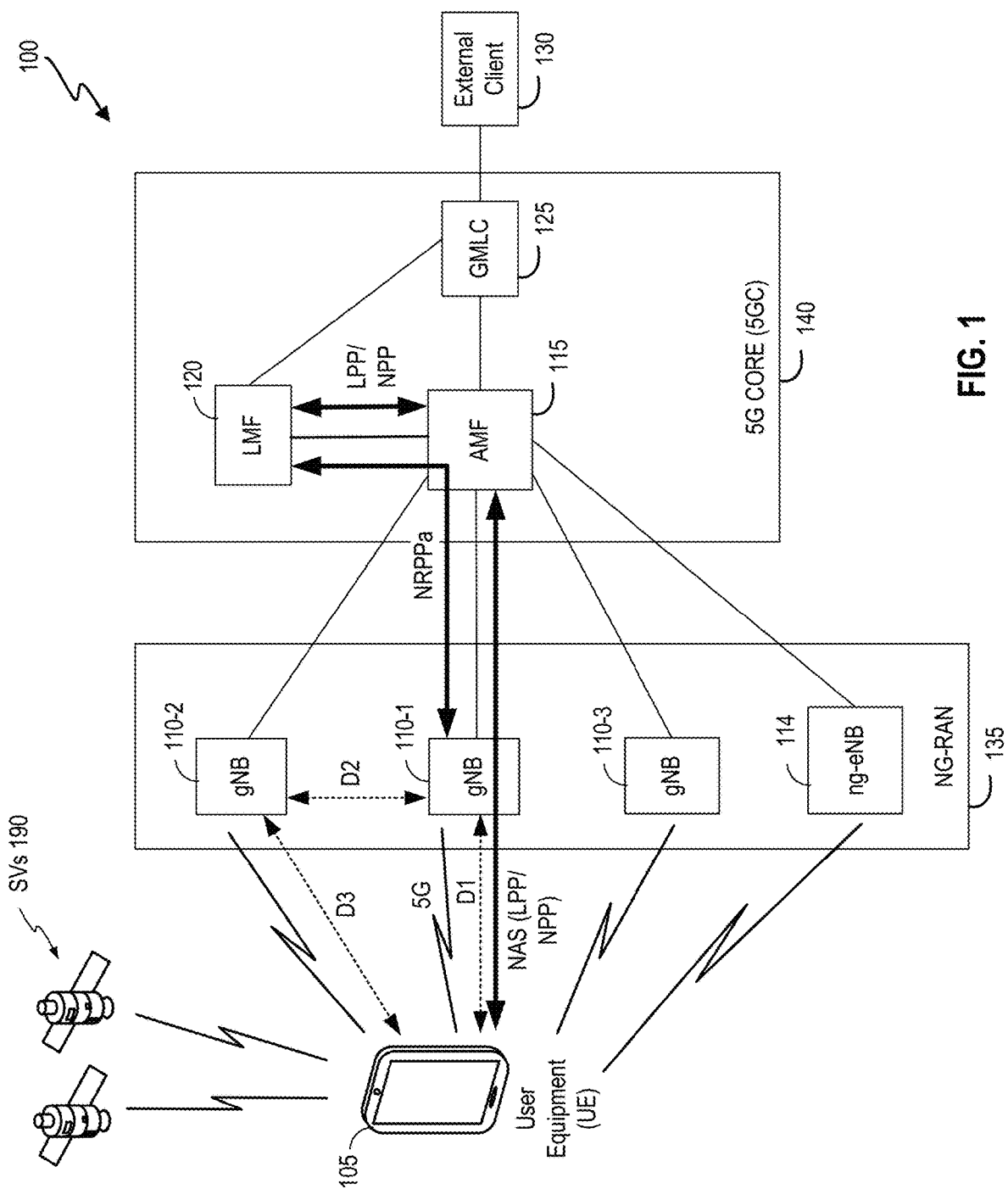
FIG. 1 is a diagram of a communication system that may utilize a 5G network to determine a location of a UE, according to some embodiments.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g., elements 110 in the previous example would refer to elements 110-1, 110-2 and 110-3).

DETAILED DESCRIPTION

Some example techniques for determining the location of a user equipment (UE) are presented herein, which may be implemented at the UE (e.g., a mobile device or mobile station), a location server (LS), a base station, and/or other devices. These techniques can be utilized in a variety of applications utilizing various technologies and/or standards, including 3rd Generation Partnership Project (3GPP), Open Mobile Alliance (OMA) Long Term Evolution (LTE) Positioning Protocol (LPP) and/or LPP Extensions (LPPe), Wi-Fi®, Global Navigation Satellite System (GNSS), and the like.

A UE may comprise a mobile device such as, for example, a mobile phone, smartphone, tablet or other mobile computer, a portable gaming device, a personal media player, a personal navigation device, a wearable device, an in-vehicle device, or other electronic device. Location determination of a UE can be useful to the UE and/or other entities in a wide variety of scenarios. There are many methods already known to determine an estimated location of the UE, including methods that involve communicating measurement and/or other information between the UE and an LS.

It is expected that fifth-generation (5G) standardization will include support for positioning methods. One example of positioning method that may be supported in a 5G network is Observed Time Difference Of Arrival (OTDOA), which is used in LTE network. With OTDOA, a UE measures time differences, referred to as Reference Signal Time Differences (RSTDs), between reference signals transmitted by one or more pairs of base stations. In LTE, the reference signals used for OTDOA may include signals that are intended only for navigation and positioning which may be referred to as Positioning Reference Signals (PRS). To perform a location measurement, a base station may be scheduled to transmit PRS signals at certain time periods using frequency resources (e.g., a pre-determined carrier frequency or a set of sub-carrier frequencies to perform the transmission). With OTDOA, a UE can measure time differences of receiving PRS signals from multiple base stations relative to a reference base station. Each time difference can correspond to a hyperbola, and the point at which these hyperbolas intersect can correspond to the UE position.

Another example of positioning method that may be supported in a 5G network is Enhanced Cell ID (E-CID), which is also used in LTE network. With E-CID, the location of the UE can be estimated using the knowledge of the geographical coordinates of its serving base station, and based on performing measurements on cell-specific reference signals received by the UE from the serving base station and from other base stations. Various measurements on the reference signals can be performed including, for example, Timing Advance, Angle-of-Arrival (AoA) measurement, Reference Signal Received Power (RSRP), Reference Signal Received Quality (RSRQ), etc. Based on the measurements, a location of the UE relative to the serving base station can be determined. The relative location can be combined with the geographical coordinates of the serving base station to estimate the location of the UE.

A base station in a 5G network can transmit signals to support the aforementioned positioning methods using multiple directional radio beams. For example, a base station can transmit PRS signals using the directional radio beams towards different areas within a cell, and a UE can perform RSTD measurements on the PRS signals received via the directional radio beams to support OTDOA operations. Moreover, the directional radio beams can also carry other reference signals to support measurements for E-CID operations. For example, for AoA measurement, a base station can estimate the angle of an uplink transmission to a UE on a directional radio beam. The UE can also perform Timing Advance, RSRP, and RSRQ measurements based on measuring the timing and power of the reference signals carried by the directional radio beams.

There are various advantages of using directional radio beams to perform positioning operations as well as other aspects of wireless communications, such as reduced interference, more efficient use of spectrum and power, etc. However, various attributes of the radio beams, such as beam widths, can affect the accuracy of the positioning operations. For example, in a case where relatively wide radio beams are used to carry reference signals, including PRS signals, the radio beams can cover a relatively large area. As a result, a UE can obtain the same measurement result (e.g., RSTD, RSRP, RSRQ, etc.) from the signals carried by the radio beam within the area, which adds uncertainty to the location determination of the UE. To reduce uncertainty to the location determination, it is desirable for a UE to perform measurements on radio signals carried by the relatively narrow radio beams.

Moreover, in a 5G network, the number of radio beams transmitted by a base station may vary between different cells, and a cell that supports a higher number of radio beams typically deploys radio beams with narrower beam widths than a cell that supports a smaller number of radio beams. For example, the 5G specification allows support of up to four radio beams for a carrier frequency range below 3 GHz, eight radio beams for a carrier frequency range between 3 GHz and 6 GHz, and 64 radio beams for a carrier frequency range exceeding 6 GHz. But currently a UE cannot obtain information about the number of radio beams and/or the beam widths of the radio beams supported by a particular cell, and the UE cannot choose which cell to perform the measurements based on the number and beam widths of the radio beams supported by the cell.

Techniques described herein below can address these issues to improve positioning methods in 5G network. Specifically, a location server, which can coordinate a positioning operation for a UE, can obtain beam support information of a plurality of cells. The location server can configure a location determination operation for a UE based on the beam support information of the plurality of cells, the location determination operation comprising measurements of one or more signals by at least one of the mobile devices or one or more cells of the plurality of cells. The location server can then determine a location of the mobile device based on results of the measurements of the one or more signals.

The beam support information can include information that can reflect the beam widths of the radio beams supported at each cell. For example, the beam support information can indicate a number of radio beams supported by each of the cells. In some examples, the beam support information can include a bitmap to indicate which of a group of radio beams are transmitted by a base station that serves each of the cells, with each bit of the bitmap being configured to identify a radio beam within the group. The bitmap can also indicate a number of radio beams supported by each of the cells. As discussed above, a cell that supports a higher number of radio beams typically deploys radio beams with narrower beam widths than a cell that supports a smaller number of radio beams. The plurality of cells can be ranked based on the number of radio beams supported, and signal measurements with cells that support a higher number of radio beams can be prioritized based on an expectation that the beam widths of the radio beams deployed at these cells are likely to be narrower. In some examples, the beam support information can also include beam widths information, which allows signal measurements to be prioritized with cells that support radio beams with narrower beam widths.

There are various ways by which the location server can obtain the beam support information. In some examples, the location server can transmit a query to the base station of each cell to request for the beam support information. In some examples, the beam support information can be provided by the base station to the location server to initialize a location information transfer transaction, e.g., as part of OTDOA Information Transfer or E-CID Location Information transfer operations. In some examples, the location server can also receive the beam support information from a third party other than the base station (e.g., via a management/maintenance operation).

There are various ways by which the location server can configure the location determination operation. In some examples, the location server can generate configuration data (e.g., Assistance Data) based on the beam support information, and send the configuration data to the UE, to enable the UE to select a subset of the cells to perform signal measurements (e.g., PRS signal measurements for OTDOA operations). In some examples, the configuration data may include the number of radio beams supported at each cell, the beam widths of the radio beams supported at each cell, etc., and the UE can select the subset of the cells supporting the highest number of beams among the cells based on the configuration data to perform the signal measurements. In some examples, the location server can also select the subset of the cells based on the beam support information and include the subset of the cells in the configuration data. The location server can also request the subset of cells to perform signal measurements with the UE (e.g., RSRP/RSRQ measurement, Timing Advance measurements, etc., for E-CID operations), to increase the frequency and/or duration of PRS signals transmission to facilitate the signal measurement at the UE, etc.

Techniques described herein can also be implemented at the UE. For example, the UE can receive the beam support information as part of configuration data (e.g., Assistance Data) from the location server, cache the beam support information, and use the beam support information to prioritize signal measurements with cells that support higher number of radio beams and/or radio beams with narrower beam widths, as described above. In some examples, the UE can also receive the beam support information via broadcast signals from neighboring cells (e.g., SIB1 (System Information Block Type 1) broadcasts). In some examples, the UE can also request the base stations of cells that support higher number of radio beams to increase the frequency and/or duration of PRS signals transmission, to improve the likelihood that the UE can perform sufficient number of PRS signals measurements for location determination within a time window.

With such arrangements, the location determination operation can be adapted based on, for example, the number of radio beams supported at the cells, the beam width of the radio beams supported at the cells, etc. Priority can be given to signal measurements with cells that support higher number of radio beams and/or narrower radio beams, which can improve the efficiency and accuracy of location determination operation.

FIG. 1 is a diagram of a communication system 100 that may utilize a 5G network to determine a location of a UE 105, according to some embodiments. Here, the communication system 100 comprises a UE 105 and a 5G network comprising a Next Generation (NG) Radio Access Network (RAN) (NG-RAN) 135 and a 5G Core Network (5GC) 140, which, along with providing OTDOA-based positioning, may provide data and voice communication to the UE 105. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from GNSS satellite vehicles (SVs) 190. Additional components of the communication system 100 are described below. It will be understood that a communication system 100 may include additional or alternative components.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long Term Evolution (LTE), High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g., the Internet) using a Digital Subscriber Line (DSL) or packet cable for example. The use of one or more of these RATs may enable the UE 105 to communicate with an external client 130 (e.g., via elements of 5GC 140 not shown in FIG. 1 or possibly via Gateway Mobile Location Center (GMLC) 125) and/or enable the external client 130 to receive location information regarding the UE 105 (e.g., via GMLC 125).

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, location estimate or location fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise.

Base stations in the NG-RAN 135 may comprise NR Node Bs which are more typically referred to as gNBs. In FIG. 1, three gNBs are shown—gNBs 110-1, 110-2 and 110-3, which are collectively and generically referred to herein as gNBs 110. However, a typical NG RAN 135 could comprise dozens, hundreds or even thousands of gNBs 110. Pairs of gNBs 110 in NG-RAN 135 may be connected to one another (not shown in FIG. 1). Access to the 5G network is provided to UE 105 via wireless communication between the UE 105 and one or more of the gNBs 110, which may provide wireless communications access to the 5GC 140 on behalf of the UE 105 using 5G (also referred as NR). In FIG. 1, the serving gNB for UE 105 is assumed to be gNB 110-1, although other gNBs (e.g., gNB 110-2 and/or gNB 110-3) may act as a serving gNB if UE 105 moves to another location or may act as a secondary gNB to provide additional throughout and bandwidth to UE 105.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135 (not shown in FIG. 1)—e.g., directly or indirectly via other gNBs 110 and/or other ng-eNBs. An ng-eNB 114 may provide LTE wireless access and/or evolved LTE (eLTE) wireless access to UE 105. Some gNBs 110 (e.g., gNB 110-2) and/or ng-eNB 114 in FIG. 1 may be configured to function as positioning-only beacons which may transmit signals (e.g., a set of pre-determined location measurement signals) and/or may broadcast assistance data to assist positioning of UE 105 but may not receive signals from UE 105 or from other UEs. It is noted that while only one ng-eNB 114 is shown in FIG. 1, the description below sometimes assumes the presence of multiple ng-eNBs 114.

As noted, while FIG. 1 depicts nodes configured to communicate according to 5G communication protocols, nodes configured to communicate according to other communication protocols, such as, for example, an LPP protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The methods and techniques described herein for support of UE 105 positioning may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE 105 accesses the NG-RAN 135 and may support location methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AoA), angle of departure (AoD), and/or other location methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Server (LS), Location Manager (LM), Location Management Function (LMF), Location Function (LF), commercial LMF (CLMF), value added LMF (VLMF), etc. A description of some of the protocols supported at LMF 120 can be found at, for example, https://www.etsi.org/deliver/etsi_ts/138400_138499/138455/15.00.00_60/ts_138455v150000p.pdf. In some embodiments, a node/system that implements the LMF 120 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g., by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

As further illustrated in FIG. 1, the LMF 120 may communicate with the gNBs 110 and/or with the ng-eNB 114 using a New Radio Location Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of UE 105 using UE assisted and/or UE based location methods such as A-GNSS, RTK, OTDOA and/or E-CID. The NRPPa protocol may be used to support positioning of UE 105 using network based location methods such as E-CID (e.g., when used with measurements obtained by a gNB 110 or ng-eNB 114) and/or may be used by LMF 120 to obtain location related information from gNBs 110 and/or ng-eNBs 114, such as parameters defining PRS transmission from gNBs 110 and/or ng-eNB 114.

With a UE assisted location method, UE 105 may obtain location measurements and send the measurements to a location server (e.g., LMF 120) for computation of a location estimate for UE 105. For example, the location measurements may include techniques based on antenna beam angle of direction (AoD) to be described below. The location measurements may also include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for gNBs 110, ng-eNB 114 and/or a WLAN access point (AP). The location measurements may also or instead include measurements of GNSS pseudorange, code phase and/or carrier phase for SVs 190. With a UE based location method, UE 105 may obtain location measurements (e.g., which may be the same as or similar to location measurements for a UE assisted location method) and may compute a location of UE 105 (e.g., with the help of assistance data received from a location server such as LMF 120 or broadcast by gNBs 110, ng-eNB 114 or other base stations or APs). With a network based location method, one or more base stations (e.g., gNBs 110 and/or ng-eNB 114) or APs may obtain location measurements (e.g., measurements of RSSI, RTT, RSRP, RSRQ, Timing Advance, etc.) for signals transmitted by UE 105, and/or may receive measurements obtained by UE 105, and may send the measurements to a location server (e.g., LMF 120) for computation of a location estimate for UE 105.

Information provided by a gNB 110 and/or ng-eNB 114 to the LMF 120 using NRPPa may include timing and configuration information for transmission of location measurement signals from the gNB 110 and/or location coordinates for the gNB 110. The LMF 120 can then provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, OTDOA, E-CID, etc. The UE 105 may send the measurements back to the LMF 120 in an LPP or NPP message (e.g., inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 150 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

Figure 2A:
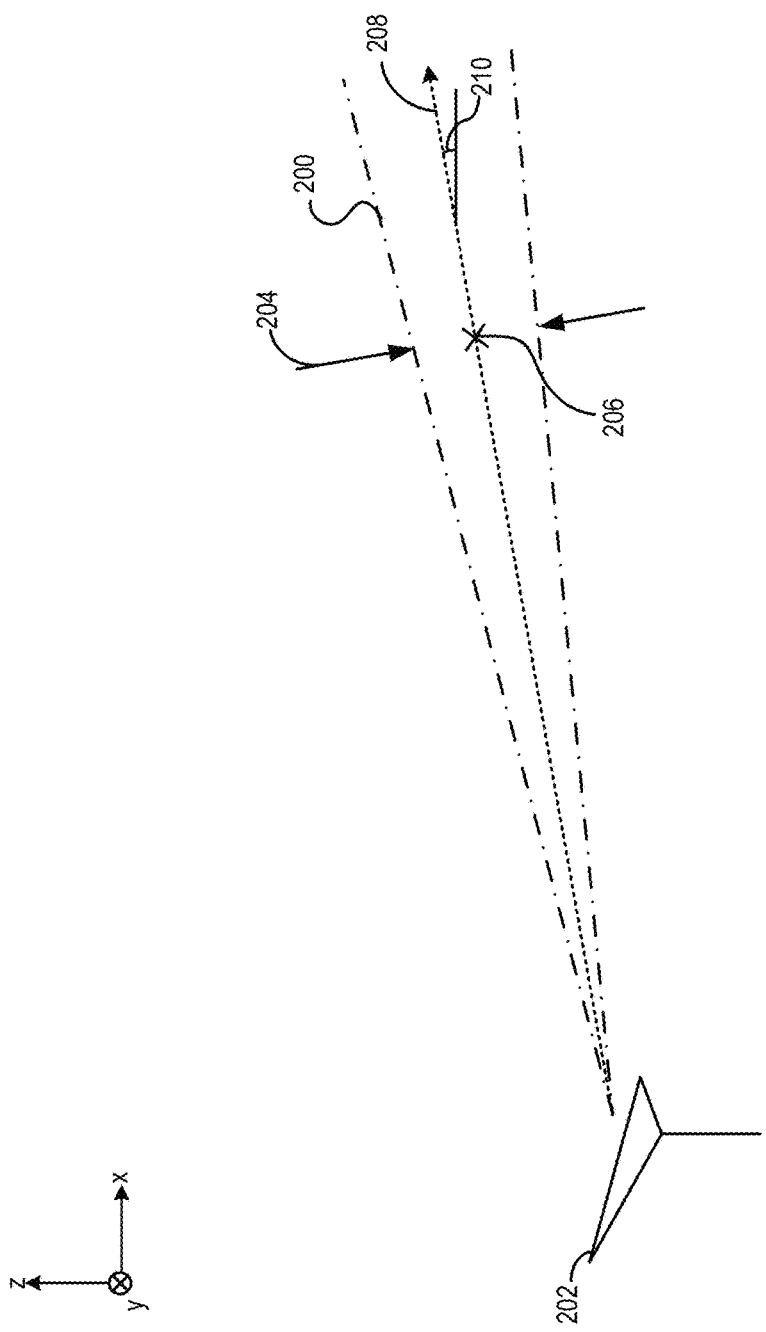
FIGS. 2A, 2B, and 2C represent examples of transmissions of radio beams, according to some embodiments.

FIG. 2A is an example of a radio beam (hereinafter, "beam") 200 that can be used for location measurement. Beam 200 may generated by an antenna 202 which can be part of, for example, gNB 110. Beam 200 may be generated based on an antenna pattern which defines a pattern of radiation of energy as a function of space. The pattern of radiation can be defined based on one or more beam widths (e.g., beam width 204) along different dimensions and a corresponding beam center (e.g., beam center 206) along a propagation path (e.g., propagation path 208) of the beam. Propagation path 208 can be associated with an angle of departure (AoD) from antenna 202 and with respect to a reference plane and/or axis. In the example of FIG. 2A, propagation path 208 may be associated with an AoD 210 with respect to an X-axis which is parallel with the horizon. The beam width may define a distance (from a corresponding beam center) where the power level of the beam drops by a pre-determined percentage (e.g., 50% or 3 dB) compared with the power level at the corresponding beam center. In some examples, antenna 202 may include a number of antenna elements each of which can transmit radio signals, and antenna 202 can set an angle of departure of a beam by setting phase differences of transmissions by each antenna elements. The phase differences can lead to constructive (or destructive) interferences among the transmitted radio signals, to form a beam along a pre-determined propagation path based on the pre-set angle of departure.

Figure 2B:
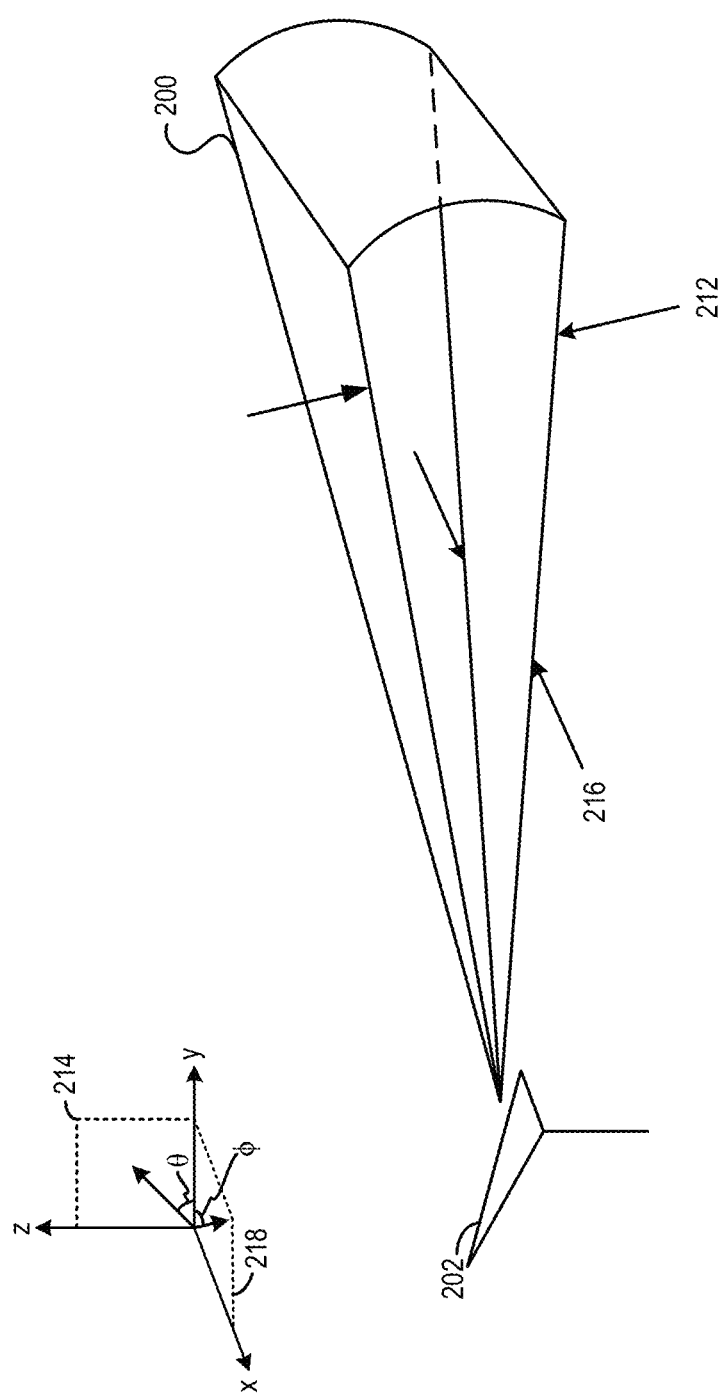

Although FIG. 2A illustrates beam 200 as a two-dimensional beam, it is understood that beam 200 can be a three-dimensional beam, and the antenna pattern that defines beam 200 can be a three-dimensional antenna pattern. FIG. 2B illustrates an example of beam 200 as a three-dimensional beam. In the example of FIG. 2B, beam 200 may be defined by a combination of two two-dimensional antenna patterns. A first two-dimensional antenna pattern, and a first beam width 212, can be defined on an elevation plane 214. Elevation plane 214 can be defined by the X-axis and a Z-axis and is perpendicular to the horizon. A second two-dimensional antenna pattern, and a second beam width 216, can be defined on an azimuth plane 218. Azimuth plane 218 can be defined by the Y-axis and the Z-axis and can be perpendicular to elevation plane 214. Beam 200 can also be associated with a first angle of departure (denoted as $\theta$) on elevation plane 214 and with reference to, for example, the Y-axis (or the Z-axis). Beam 200 can also be associated with a second angle of departure (denoted as $\phi$) on azimuth plane 218 and with reference to, for example, the Y-axis (or the X-axis).

Figure 2C:
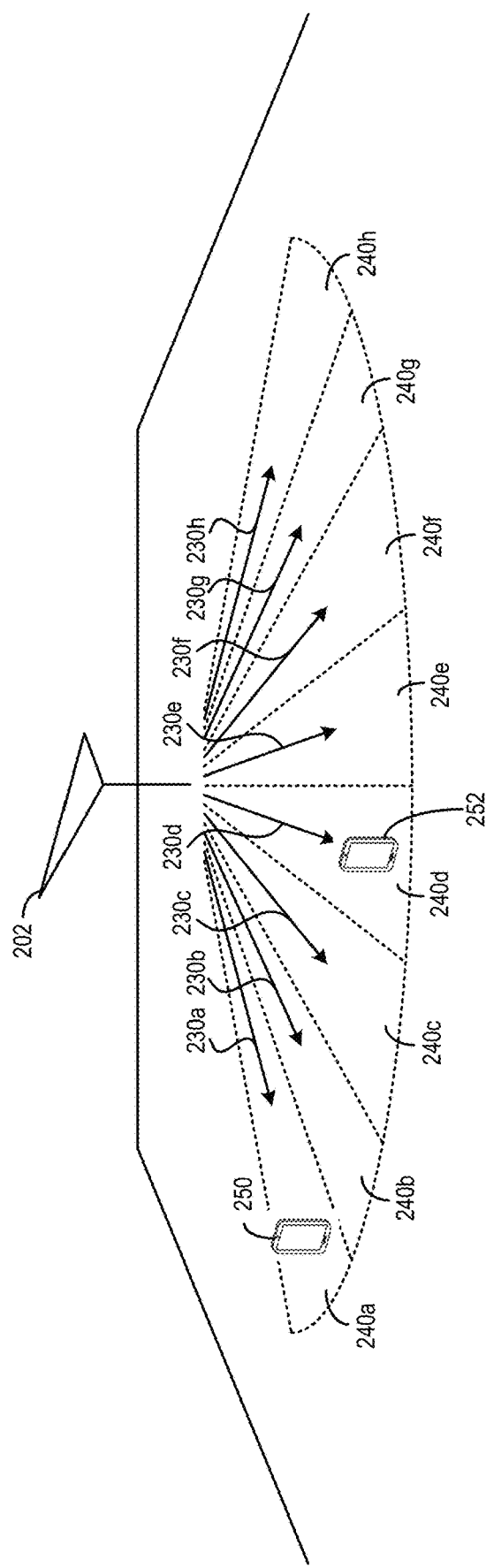

In a 5G network, antenna 202 may be configured to transmit a number of beams, with each beam having a different angle of departure (e.g., different angles on the elevation plane and/or on the azimuth plane) and targeted at a pre-determined geographical region. FIG. 2C illustrates an example of a beam transmission scheme by antenna 202 in a 5G network. In the example of FIG. 2C, antenna 202 may transmit beams 230a, 230b, 230c, 230d, 230e, 230f, 230g, and 230h to, respectively, one of regions 240a, 240b, 240c, 240d, 240e, 240f, 240g, and 240h. To avoid interference between the beams, the beam width of each beam can be adapted based on the total number of beams transmitted. For example, the beam width of beams 230a-230h is typically smaller than a case where antenna 202 only transmits beams 230a-230d to the cell area covering regions 240a-240h. The beam width of beams 230a-230h can be further reduced if additional beams are also transmitted by antenna 202 to the cell area covering regions 240a-240h. With such arrangements, a mobile device located in one of the regions 240a-240h may receive only one of beams 230a-230h as a direct line-of-sight beam. For example, mobile device 250, located in region 240a may receive radio beam 230a as a direct line-of-sight beam (versus as a reflected or deflected beam) from antenna 202. However, mobile device 250 is unlikely to receive radio beam 230b as a direct line-of-sight beam. Moreover, mobile device 252, located in region 240d and also camping in the cell, may receive radio beam 230d as a direct line-of-sight beam from antenna 202.

Each of beams 230a-230h may carry various information. For example, each of beams 230a-230h may carry data representing a beam identifier associated with the respective beam. Moreover, the beams may carry signals used for radio frame synchronization and beam tracking, such as Primary Synchronization Sequences (PSS), Secondary Synchronization Sequences (SSS), Physical Broadcast Channel (PBCH) signals, Tracking Reference Signals (TRS), etc. Each beam may also be used to carry reference signals for location determination, such as PRS signals for OTDOA operations, other reference signals to support Timing Advance, RSRP, and RSRQ measurements for E-CID operations, etc. Each beam can include a sequence of radio frames to transmit PSS, SSS, PBCH, TRS signals. Each radio frame may be associated with a period of transmission, and can be organized into a number of subframes. Each subframe may be further divided into a number of symbol periods, with each symbol period being used for transmission of a symbol. Each symbol can be transmitted by modulating a set of subcarriers allocated as resource elements, with each subcarrier occupying a different frequency band. Each of PSS, SSS, PBCH, and TRS signals can include a sequence of symbols formed by modulating a set of subcarriers in a set of symbol periods.

Figure 3A:
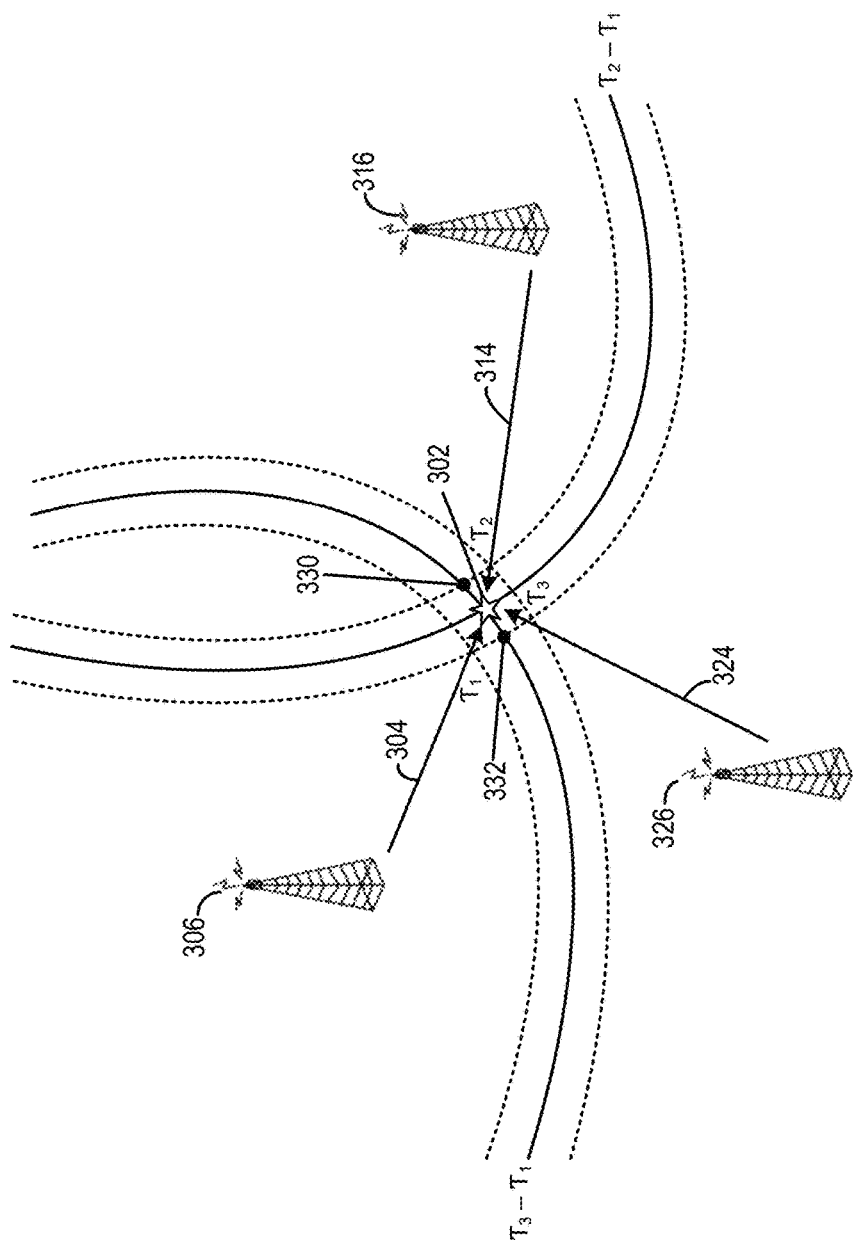
FIGS. 3A and 3B represent an example of location measurement using radio beams, according to some embodiments.

As described above, the directional radio beams transmitted by base stations can be used to support various positioning operations, such as OTDOA and E-CID. FIG. 3A illustrates an example of an OTDOA operation. As shown in FIG. 3A, a UE 302 (represented by a star in FIG. 3A) can receive beam 304 carrying a reference signal from gNB 306, a beam 314 carrying a reference signal from gNB 316, and a beam 324 carrying a reference signal from gNB 326. The reference signals carried by the beams can include position measurement signals, such as PRS signals. UE 302 can measure three time-of-arrivals (TOA) $\tau_1$, $\tau_2$, and $\tau_3$ of the reference signals received from, respectively, beams 304, 314, and 324 to perform RSTD measurement. To perform RSTD measurement, one of the TOA (e.g., $\tau_1$) can be selected as a reference, and two time differences $t_{2,1}$ (which represents $\tau_2-\tau_1$) and $t_{3,1}$ (which represents $\tau_3-\tau_1$) can be determined. Each time difference can represent a hyperbola, and the point at which the two hyperbolas (e.g., of $t_{2,1}$ and $t_{3,1}$) intersects can represent an estimated location of UE 302.

Each time difference measurement can have certain uncertainty, which is represented by the dotted lines in FIG. 3A. One potential source of uncertainty can come from the finite beam width. For example, due to finite beam width of beam 304, UE 302 can detect the same TOA $\tau_1$ at locations 330 and 332, which contribute to the uncertainty in the estimation of location of UE 302. By reducing the beam width of beam 304, the distance between locations 330 and 332 can shrink, and the uncertainty of location estimation of UE 302 can be reduced. As to be described in more details below, PRS measurements can be prioritized for cells that support radio beams with narrower beam widths to improve the accuracy of location determination operations.

Figure 3B:
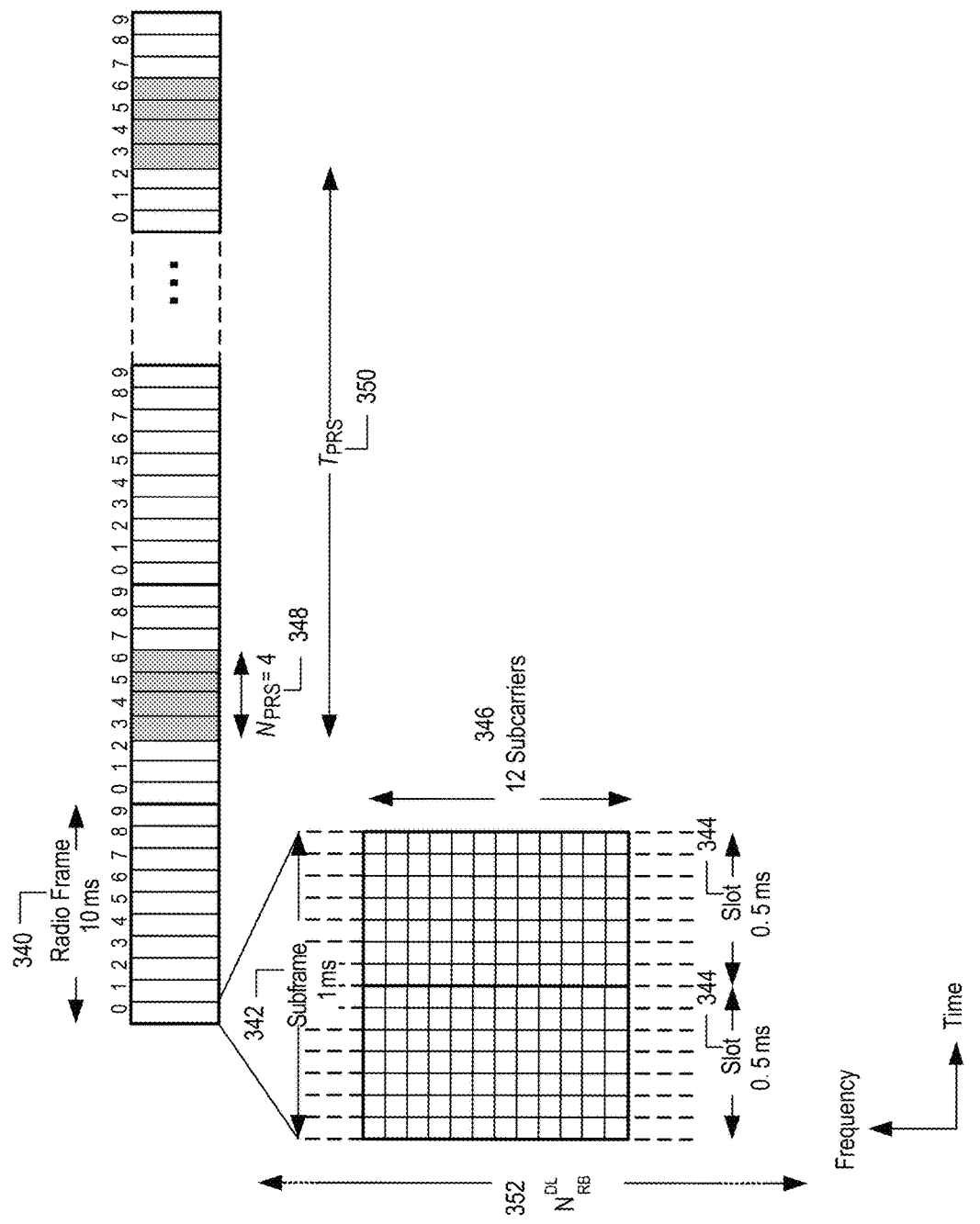

FIG. 3B is an example of the structure of a LTE subframe sequence of position measurement signals (e.g., PRS). A similar subframe sequence structure can also be used in the system of FIG. 1 and can be transmitted using the radio beams of FIG. 2A-FIG. 2C and of FIG. 3A. In FIG. 3B, time is represented horizontally (e.g., on an X axis) with time increasing from left to right, while frequency is represented vertically (e.g., on a Y axis) with frequency increasing (or decreasing) from bottom to top, as illustrated. As shown in FIG. 3B, downlink and uplink LTE Radio Frames 340 can be 10 ms duration each. For downlink Frequency Division Duplex (FDD) mode, Radio Frames 310 are organized into ten subframes 342 of 1 ms duration each. Each subframe 342 comprises two slots 344, each of 0.5 ms duration. Each slot of slots 344 may include seven symbol periods (in the case of normal cyclic prefix (NCP) as shown in FIG. 3B) or six symbol periods (in the case of extended cyclic prefix (ECP)), with each symbol period for transmission of a symbol. Up to 12 symbols (in the case of ECP) or 14 symbols (in the case of NCP) can be transmitted within subframe 342. It is understood that in a 5G network, the number of symbols in one slot can include a different number (other than six or seven) of symbol periods, and a pre-determined pattern of the symbols transmitted in the symbol periods can represent a position measurement signal in the 5G network.

In the frequency domain, the available bandwidth may be divided into uniformly spaced orthogonal subcarriers 346. For example, for a normal length cyclic prefix using 15 kHz spacing, subcarriers 346 may be grouped into a group of 12 subcarriers. Each grouping, which comprises 12 subcarriers 346, in FIG. 3B, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration, is indicated as $N_{RB}^{DL}$ 352. For example, for a 3 MHz channel bandwidth in the above example, the number of available resource blocks on each channel 352 is given by $N_{RB}^{DL}=15$. It is understood that in a 5G network, a resource block can include a different number (other than 12 or 15) of subcarriers, and the subcarriers can occur a different channel bandwidth than, for example, the 3 MHz channel bandwidth discussed above.

A position reference signal (PRS), which has been defined in 3GPP LTE Release-9 and later releases, may be transmitted by an eNB after appropriate configuration (e.g., by an Operations and Maintenance (O&M) server). A PRS may be transmitted in downlink transmissions as a broadcast signal directed to all UEs within a radio range from the eNB, and the PRS can be used by the UEs as a position measurement signal for position determination. A PRS can be transmitted in special positioning subframes that are grouped into positioning occasions. For example, in LTE, a PRS positioning occasion can comprise positioning subframes 348, which can include a number $N_{PRS}$ of consecutive positioning subframes where the number $N_{PRS}$ may be between 1 and 160 (e.g., may include the values 1, 2, 4 and 6 as well as other values). The time of arrival (TOA) can be determined based on, for example, when the UE receives the start of a PRS subframe.

The PRS positioning occasions may occur periodically at intervals 350, denoted by a number $T_{PRS}$, of millisecond (or subframe) intervals where $T_{PRS}$ may equal 5, 10, 20, 40, 80, 160, 320, 640, or 1280. As an example, FIG. 3B illustrates a periodicity of positioning occasions where $N_{PRS}$ equals 4 and $T_{PRS}$ is greater than or equal to 20. In some embodiments, $T_{PRS}$ may be measured in terms of the number of subframes between the start of consecutive positioning occasions. UE can receive PRS scheduling information from a location server as part of Assistance Data, which indicates the times when the PRS positioning occasions are scheduled to occur, and the durations of the PRS positioning occasions. The UE can perform TOA measurement on one or more positioning occasions at the scheduled times.

In 5G network, the duration of a PRS positioning occasion (represented by $N_{PRS}$) and the period between each PRS positioning occasion (represented by $T_{PRS}$) can be adjusted dynamically (e.g., based on a request of a location server, a UE, etc.) to implement an "On Demand PRS" scheme. Transmitting PRS through static scheduling (e.g., having a fixed $T_{PRS}$ and $N_{PRS}$) can lead to inefficient usage of resource blocks. For example, PRS might be used for positioning during emergency calls, asset tracking and other applications which might not need PRS for a significant portion of time. For those applications, it is advantageous to dynamically alter the PRS scheduling. For example, for applications that do not need PRS for a significant portion of time (e.g., emergency calls), the duration of a PRS positioning occasion can be reduced, the period between PRS positioning occasions can be increased, etc., to free up the resource blocks for other applications. Moreover, as to be described in more details below, base stations that transmitted radio beams of narrower beam widths can be controlled to increase the duration of PRS positioning occasions, reduce the period between PRS positioning occasions, allocate more bandwidth (e.g., by allocating more resource blocks) for the PRS symbol transmission, etc. Such arrangements can improve the likelihood that the UE can perform a sufficient number of PRS signal measurements with base stations that support more accurate measurements (by supporting narrower radio beams), which can improve the efficiency and accuracy of the location determination operation.

Figure 4A:
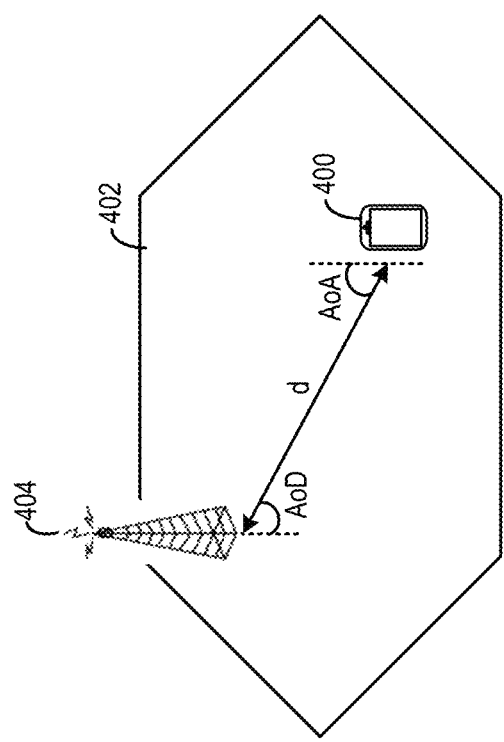
FIGS. 4A and 4B represent another example of location measurement using radio beams, according to some embodiments.

FIG. 4 illustrates an example of E-CID operation, which can also be supported by directional radio beams transmitted by a base station. As shown in FIG. 4, UE 400 is in a cell 402 served by a base station 404. As part of E-CID operation, signal measurements can be made by base station 404 and/or by UE 400 to determine a distance d between UE 400 and base station 404, and an angle of arrival (AoA) of the radio beam at UE 400 on a horizontal plane.

There are different ways by which the distance d can be measured, such as by measuring the power of a signal received at the UE from the base station, to determine a degree of attenuation (e.g., due to path loss, signal fading, etc.) of the signal power. The degree of attenuation can be used to determine the distance d. Alternatively, a propagation delay between the UE and the base station can also be measured, and the propagation delay can also be used to determine the distance d. For example, UE 400 can measure Reference Signal Received Power (RSRP), which is the average power of a resource element that carries a cell specific Reference Signal (RS) received at the UE. Another measurement that UE 400 can perform is Reference Signal Received Quality (RSRQ), which can be based on a ratio between RSRP and average total received power (e.g., based on Received Signal Strength Indicator (RSSI)). UE 400 can perform the RSRP and/or RSRQ measurements and report the measurements results back to a base station 404. As another example, to measure propagation delay, base station 404 can measure a time difference in the transmission and reception of a subframe as part of Timing Advance measurement. Base station 404 may transmit a signal to UE 400 which includes a time of transmission of the signal. UE 400, upon receiving the signal from base station 404, can also determine a time of reception of the signal, and report the time of reception back to base station 404. Base station 404 can determine the time difference between the time of transmission of the signal and the time of reception of the signal. The time difference can represent the Timing Advance measurement. Base station 404 can transmit the timing Advance measurement in a Timing Advance (TA) command to UE 400 to synchronize uplink timing with downlink transmission from base station 404.

In addition, base station 404 can also measure AoA with based on the angle of departure (AoD) of a directional radio beam transmitted to UE 400. For example, base station 404 determines that a radio beam of certain AoD is transmitted to UE 400 as part of uplink transmission, and receives a report back from UE 400 that the UE has received the radio beam, base station 404 can determine the AoA of the radio beam at the UE as identical to the AoD of the same radio beam at base station 404.

In some examples, base station 404 can transmit the RSRP, RSRQ, and Timing Advance measurements, as well as the AoA measurement results, to a location server in an E-CID Measurement Initiation Response which can be part of LPPa and/or NRPPa procedure. In some examples, UE 400 can also report some the measurements results (e.g., RSRP, RSRQ, and receive-transmit time difference) directly to the location server in an E-CID-SignalMeasurementInformation message which can be part of LPP and/or NRPP procedure. The location server can then estimate a location of UE 400 based on a relative location of UE 400 with respect to base station 404 (e.g., based on AoA and distance estimated from RSRP, RSRQ, and/or Timing Advance measurements), as well as the known location of base station 440.

Figure 4B:
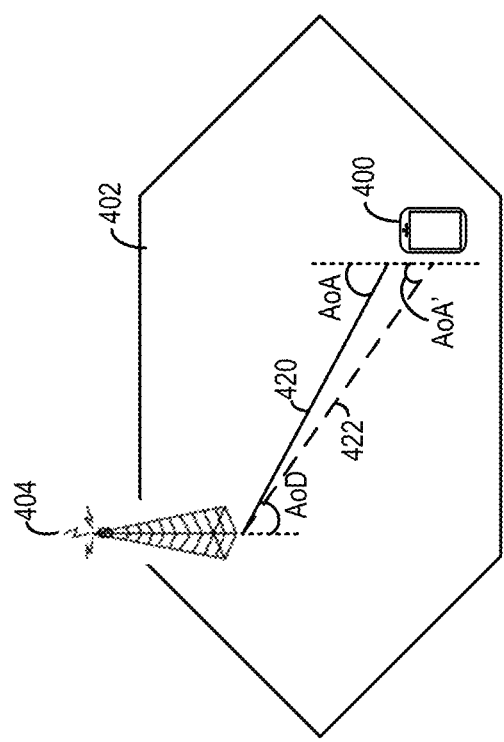

Similar to OTDOA operation, the accuracy of E-CID operation can also be affected by the beam width of the radio beams used for the measurement. For example, as shown in FIG. 4B, instead of receiving the central part 420 of the radio beam, UE 400 receives the edge part 422 of the radio beam. Due to the finite beam width, the actual angle of arrival is AoA' is different from AoA as well as AoD. Using AoD to estimate the direction of UE 400 with respect to base station 404 can lead to error. Moreover, due to the finite beam width, UE 400 may also obtain similar RSRP, RSRQ, and/or Timing Advance measurement results at different locations with the cell. By reducing the beam width, the uncertainties in the location determination using E-CID operations can be reduced. As to be described in more details below, E-CID operation can also be prioritized for cells that support radio beams with narrower beam widths to improve the accuracy of location determination operations.

In addition to beam width and/or number of radio beams information, it can also be advantageous for a UE to have other information about the radio beams transmitted by a base station, such as the direction, the target area, etc. Such information can be useful for the UE to determine whether it is likely to receive a radio beam from the base station. If the UE determines that it is unlikely to receive a radio beam from the base station, the UE can skip the signal measurement operations (for OTDOA, for E-CID, etc.) with that base station and perform the signal measurement operations with other base stations instead. With such arrangements, the efficiency of location determination operation can be improved.

Figure 5:
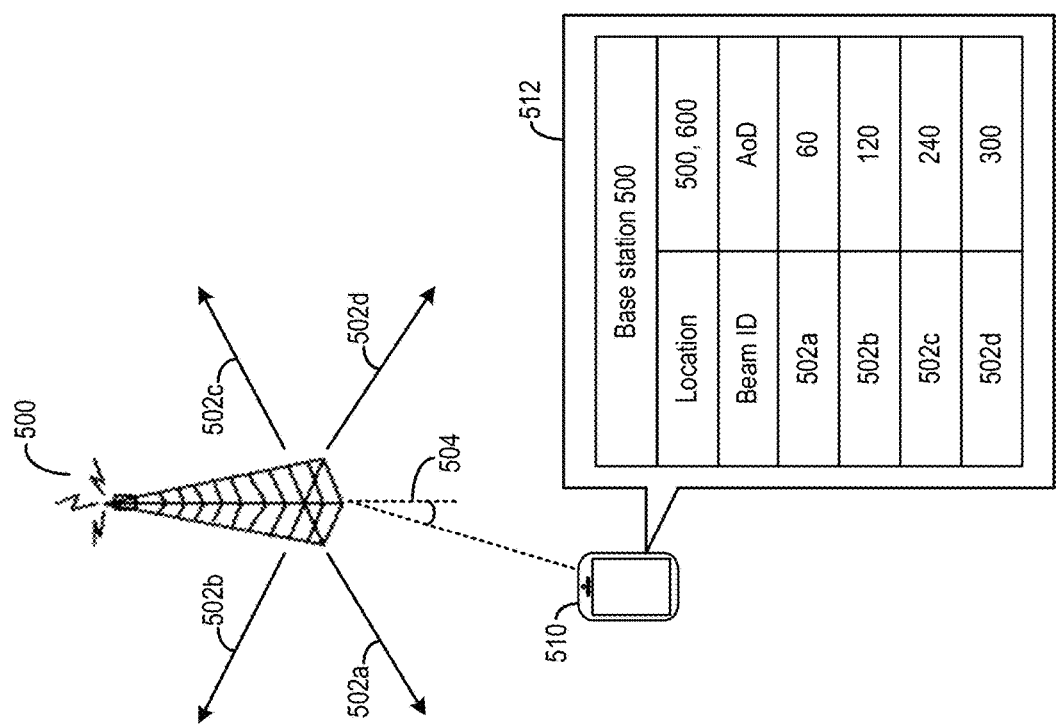
FIG. 5 illustrates an example of a signal measurement operation based on the information of the radio beams transmitted by the base station, according to some embodiments.

FIG. 5 illustrates an example of UE skipping signal measurement operations with a base station based on the information of the radio beams transmitted by the base station. As shown in FIG. 5, base station 500 transmits four radio beams 502*a*, 502*b*, 502*c*, and 502*d* at AoDs of, respectively, 60°, 120°, 240°, and 300° (e.g., in a counter-clockwise direction with respect to axis 504). UE 510 may store information 512 that maps the beam IDs of radio beams transmitted by base station 500 (502*a*, 502*b*, 502*c*, and 502*d*) to the AoDs 60°, 120°, 240°, and 300°. Information 512 also includes the location of base station 500. UE 510 may obtain a coarse measurement of its own location (e.g., based on GPS, WiFi, etc.). Based on the coarse measurement, as well as the location of base station 500 and the AoDs of the radio beams from information 512, UE 510 can determine whether it is likely to receive any of radio beams 502*a*, 502*b*, 502*c*, or 502*d*. In the example of FIG. 5, based on the coarse measurement of its location, UE 510 may determine that it is unlikely to receive any of radio beams 502*a*, 502*b*, 502*c*, or 502*d*, and skip the signal measurement operations with base station 500.

Figure 6A:
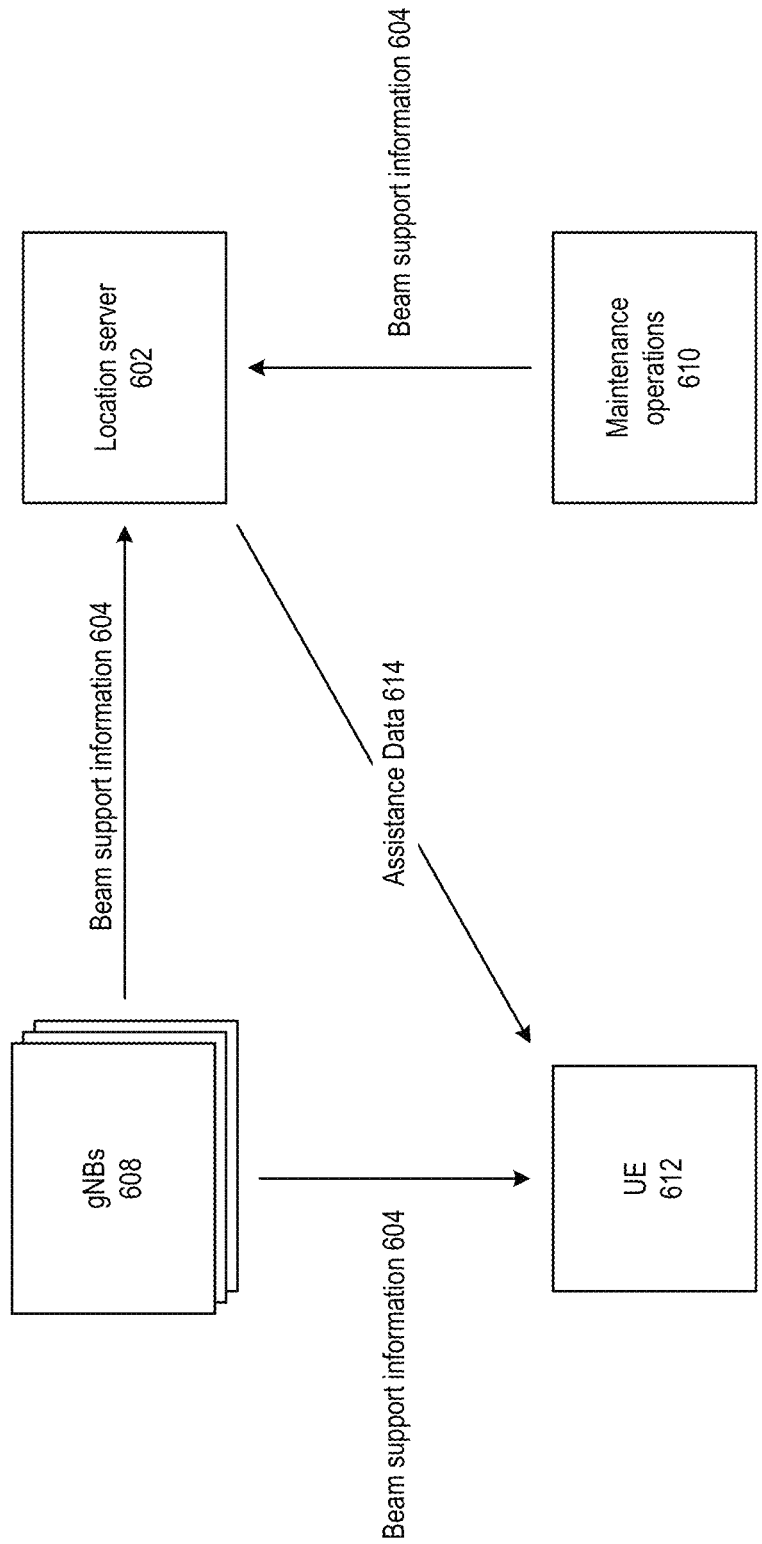

FIG. 6A is a diagram of communication system 600 may utilize radio beam support according to some embodiments. information to support location determination operation in a 5G network, according to some embodiments. As shown in FIG. 6A, a location server 602 (e.g., which can include or be part of LMF 120 of FIG. 1) can obtain beam support information 604 from gNBs 608 and/or from maintenance operations 610 (e.g., programming operations). As to be discussed in more details below, location server 602 can configure a location determination operation for a UE 612 based on beam support information 604. For example, location server 602 can select, based on beam support information 604, a subset of gNBs 608 to perform the location determination operation with UE 612. As another example, location server 602 can also transmit beam support information 604 (and/or derived information) to UE 612 as part of Assistance Data 614 to enable or control UE 612 to perform the location determination operation with the subset of gNBs 608. In some examples, UE 612 can also receive beam support information 604 directly from gNBs 608.

Beam support information 604 can come in various forms. In some examples, beam support information 604 for a cell can include a number that indicates a number of radio beams supported in that cell, which enables location server 602 and/or UE 612 to determine, for example, the relative beam width of radio beams at different cells. In some examples, beam support information 604 can include information to identify each radio beam supported at the cell. For example, beam support information 604 can include a bitmap, with each bit corresponding to a particular radio beam, and the value of each bit can indicate whether the radio beam is supported in that cell. In some examples, beam support information 604 can include beam width information (e.g., a first beam width measured in the elevation plane and a second beam width measured in the azimuth plane), which can directly provide the beam width information of each cell to location server 602 and/or UE 612.

There are different ways by which location server 602 can obtain beam support information 604 from gNBs 608. In some examples, location server 602 can transmit a query to gNBs 608 using NRPPa procedures to request beam support information 604. In some examples, as part of E-CID Location Information Transfer under the NRPPa procedures, location server 602 can transmit a message for an E-CID measurement initiation request to each of gNBs 608 to initiate E-CID operations with the gNBs, and the message may include an information element (IE) for beam support information. An excerpt of an example E-CID measurement initiation request message 620 is shown in FIG. 6B. As shown in FIG. 6B, E-CID measurement initiation request message 620 includes an IE 622 labelled "Actual Beam Support." IE 622 can be a 6-bit number that ranges between 1-64 and can indicate a number of radio beams supported by a cell, with the range being set based on, for example, the 5G specification. In addition, E-CID measurement initiation request message 620 also includes an IE 624 labelled "Measurement Quantities Item." IEE 624 can include a set of measurements which location server 602 has selected and to be performed by the recipient gNB. The measurements may include, for example, reporting of a cell identifier of the cell, a set of identifiers of the radio beams supported by the cell, Angle of Arrival (AoA), Timing Advance, RSRP, RSRQ, etc. for each beam identified by the set of identifiers. As part of the E-CID Location Information Transfer, gNB may receive E-CID measurement initiation request message 620, parse the message to identify the IE requested by location server 602, and provide the data for the requested IE (e.g., the number of radio beams supported by the cell, and the results of the requested measurements) in an E-CID measurement initiation response message back to location server 602.

In some examples, as part of OTDOA Information Transfer under the NRPPa procedures, location server 602 can transmit a message for an OTDOA information request to each of gNBs 608 to initiate OTDOA operations with the gNBs, and the message may also include an information element (IE) for beam support information. An excerpt of an example OTDOA information request message 640 is shown in FIG. 6C. As shown in FIG. 6C, OTDOA information request message 640 includes an IE 642 labelled "Actual Beam Support." IE 642 can be a 6-bit number that ranges between 1-64 and can indicate a number of radio beams supported by a cell, with the range being set based on, for example, the 5G specification. As part of the OTDOA Information Transfer, gNB may receive OTDOA information request message 640, parse the message to identify IE 642, and provide the number of radio beams information to location server 602 in an OTDOA information response message.

In addition, as described above, UE 612 can also receive beam support information 604 directly from gNBs 608 in various ways. In some examples, UE 612 may receive beam support information 604 while establishing or reconfiguring a Radio Resource Control (RRC) connection with one of gNBs 608. In some examples, UE 612 may also receive broadcast messages (e.g., System Information Block Type 1 (SIB1) messages) from gNBs 608. FIG. 6D illustrates an excerpt of an example SIB1/RRC Reconfig message 650. As shown in FIG. 6D, SIB1/RRC Reconfig message 650 includes an IE 652 labelled "PositionInBurstLongBitmap." IE 652 can be in the form of a 64-bit bitmap, with each bit representing/identifying a radio beam. A bit value of "1" can indicate that the radio beam represented by the bit is transmitted in the cell, whereas a bit value of "0" can indicate that the radio beam represented by it is not transmitted in the cell. The bitmap information can be combined with additional information including, for example, the angle of arrival (AoA) of each beam represented in the bitmap, a coarse estimate of the present location of the UE, known location of the base station that serve the cell, etc., to determine whether a UE is likely to receive some or all of the radio beams transmitted in the cell, as described above. In the example of FIG. 6D, the cell transmits all 64 radio beams allowed under the 5G specification. In some examples, the "PositionInBurstLongBitmap" bitmap can be included in E-CID measurement initiation request/response message and in OTDOA information request/response message in lieu of or in addition to the 6-bit "Actual Beam Support" number.

In some examples (not shown in FIG. 6B-FIG. 6D), E-CID measurement initiation request/response messages, OTDOA information request/response messages, SIB1/RRC Reconfig messages, or other messages sent by gNBs 608 to the location server may also include other forms of beam support information 604. For example, beam support information 604 may include beam width information. For example, these messages can include a first beam width (measured in the elevation plane) and a second beam width (measured in the azimuth plane) of each of the beams supported in a cell. In some examples, gNBs 608 may also transmit PRS codebook information (which can be part of beam support information 604) which encapsulates specifically the beams which are enabled along specific elevation and azimuth angles.

After receiving beam support information 604 from each of gNBs 608, location server 602 and/or UE 612 can store a data structure (e.g., a mapping table) that maps each cell served by gNBs 608 to the corresponding beam support information 604. In some examples, the cells in the data structure can be ranked based on, for example, the number of beams supported in each cell, the beam width of the beams in each cell, the number of beams a UE is likely to receive, etc. For example, the top ranked cells can have the highest number of beams and/or narrowest beam width among the cells in the data structure. Location server 602 and/or UE 612 can configure a location determination operation (e.g., OTDOA operation, E-CID operation, etc.) based on a result of the ranking.

Figure 7A:
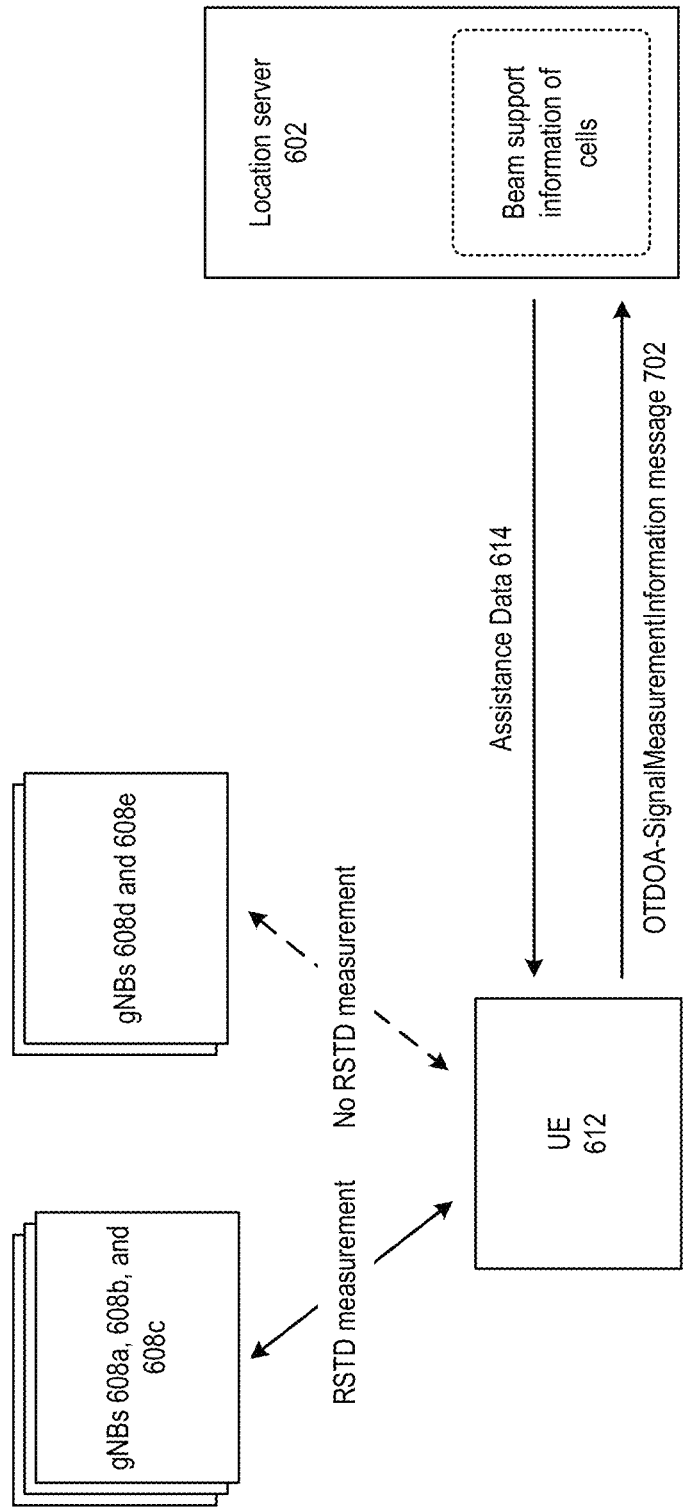
FIGS. 7A, 7B, 7C, and 7D illustrate examples of location determination operations adapted based on the radio beam support information of FIGS. 6B-6D, according to some embodiments.

FIG. 7A-FIG. 7D illustrate examples of location determination operations adapted based on support information 604. In FIG. 7A, location server 602 can transmit Assistance Data 614 to UE 612. Assuming that UE 612 has a limited time allocated for performing OTDOA operations and can perform measurements with no more than three base stations within the allocated time, location server 602 can rank the beam support information and select the top three cells (e.g., served by gNBs 608a, 608b, and 608c) having the highest number of beams (or narrowest beam width) among gNB 608, and include the three cells in Assistance Data 614, which enables UE 612 to only perform RSTD measurements with gNBs 608a, 608b, and 608c, and not to perform RSTD measurements with other gNBs 608 (e.g., gNBs 608d and 608e), for better localization and to reduce position uncertainty as explained above. In some examples, location server 602 may also determine an approximate location of UE 612 with respect to the base stations of the cells. Based on the beam support information which indicate the beams supported at each cell, and based on the approximate location of UE 612 with respect to the base stations of these cells, location server 602 can select a set of cells for which beams are enabled at the approximate direction/location of UE 612, such that UE 612 only performs signals measurements with these cells. In some examples, UE 612 can also include beam support information 604 of all of the cells served by gNBs 608 in Assistance Data 614, and UE 612 can perform the ranking and select the top three cells to perform the RSTD measurements. After performing the RSTD measurements, UE 612 can include the RSTD measurement results in an OTDOA-SignalMeasurementInformation message 702 back to location server 602, which can then determine a location of UE 612 based on the RSTD measurement results.

Figure 7B:
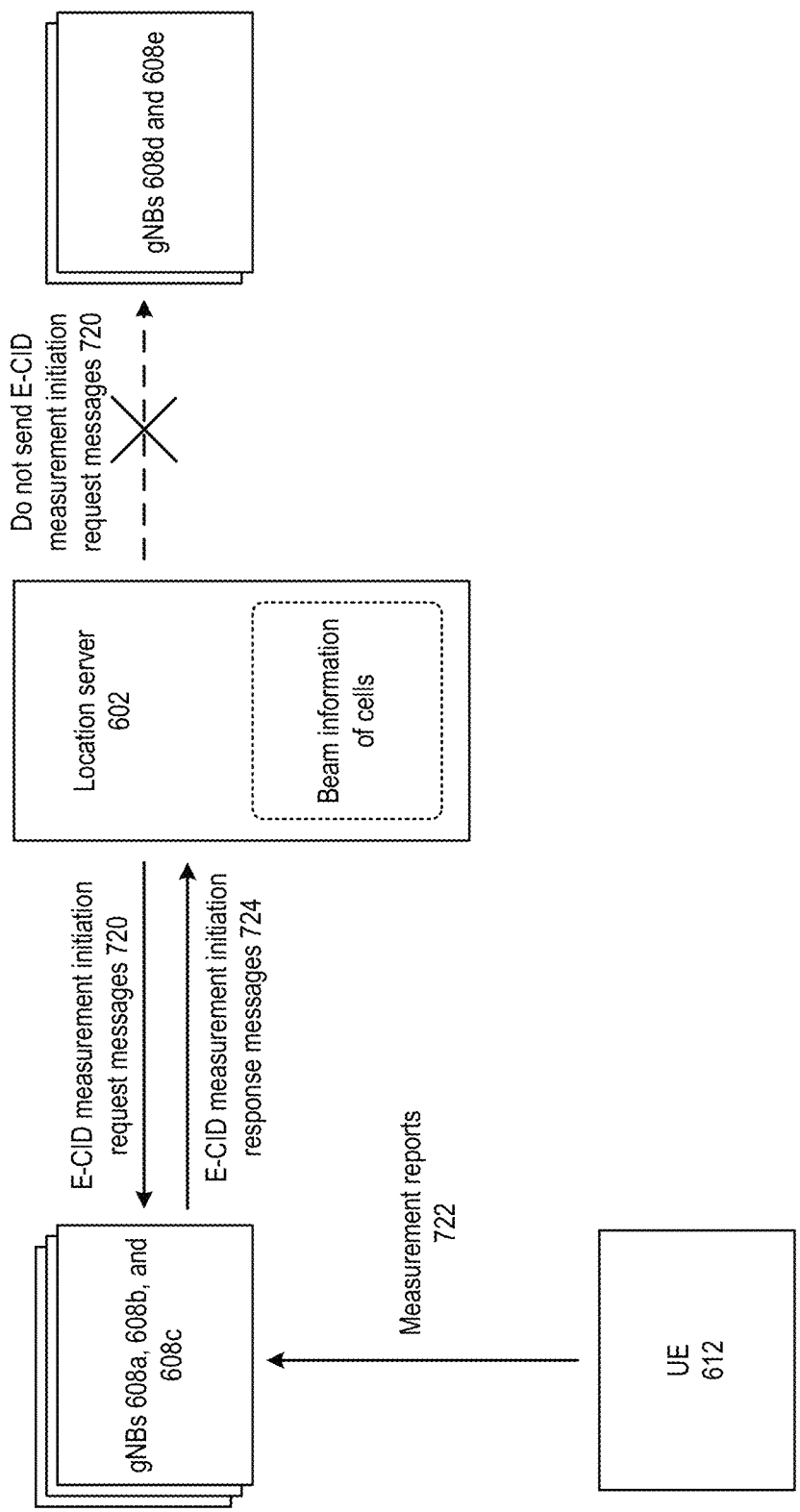

FIG. 7B illustrates another example of location determination operations adapted based on support information 604. As shown in FIG. 7B, location server 602 can select a subset of gNBs 608 based on the ranking, and request the subset of gNBs 608 to perform E-CID operations with UE 612. For example, based on the ranking, location server 602 can transmit E-CID measurement initiation request messages 720 to gNBs 608a, 608b, and 608c, with each message including the item to be measured (e.g., Angle of Arrival (AoA), Timing Advance, RSRP, RSRQ, etc.). Location server 602 also does not transmit E-CID measurement initiation request messages 720 to other gNBs 608 (e.g., gNBs 608d and 608e). Subsequently, gNBs 608a, 608b, and 608c can perform the requested measurements with UE 612, receive measurement reports 722 from UE 612, and include the measurement results in E-CID measurement initiation response messages 724 back to location server 602, which can then determine a location of UE 612 based on the E-CID measurement results.

Figure 7C:
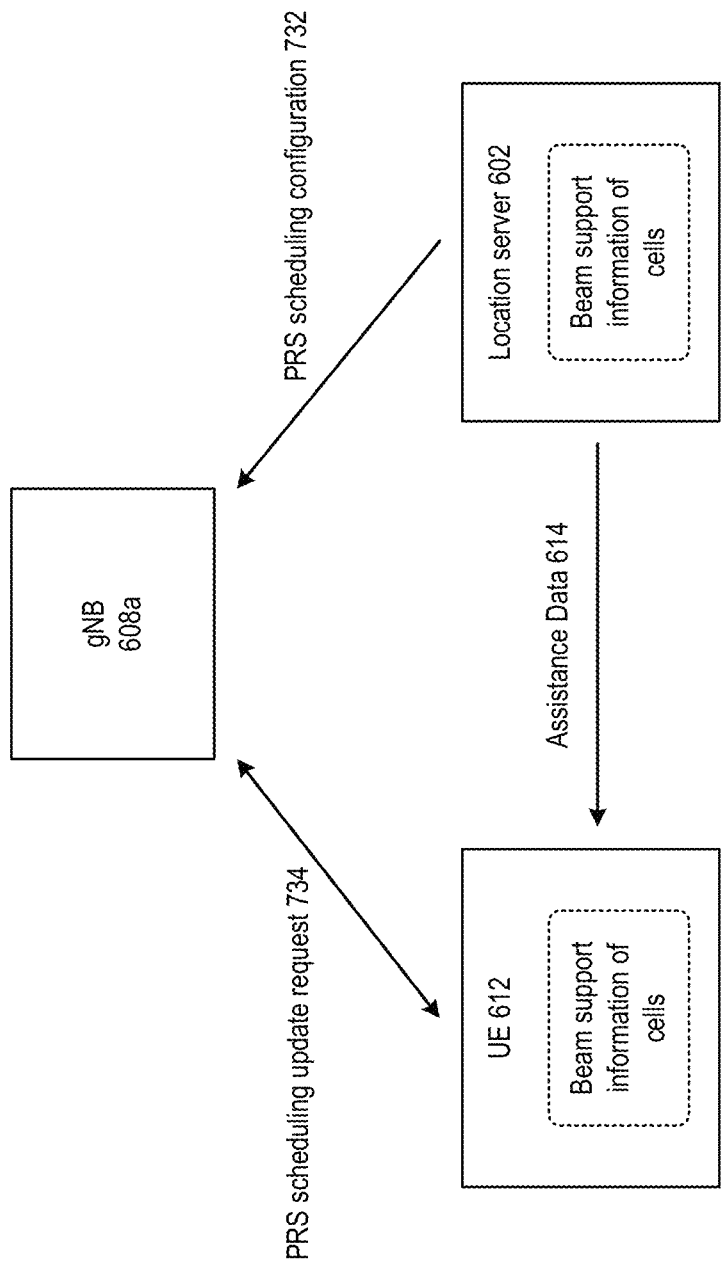

FIG. 7C illustrates another example of location determination operations adapted based on support information 604. As shown in FIG. 7C, at least one of location server 602 or UE 612 can select a cell (e.g., served by gNB 608a) that supports a relatively high number of radio beams (or supports radio beams of relatively narrow beam width) and, as part of "On Demand PRS" operation, request the selected cell to update scheduling of PRS transmission. The updating can be targeted at maximizing the quality of RSTD measurements performed by UE 612 within an allocated time for the measurements, to improve the efficiency and accuracy of the OTDOA operation. The updating to the scheduling of PRS transmission can include, for example, increasing the duration of PRS positioning occasions, reducing the period between PRS positioning occasions, allocating more bandwidth (e.g., by allocating more resource blocks) for the PRS symbol transmission, etc. Location server 602 can configure the PRS scheduling at gNB 608a via PRS scheduling configuration 732, whereas UE 612 can transmit a PRS scheduling update request 734 to gNB 608a, to update the PRS scheduling.

Figure 7D:
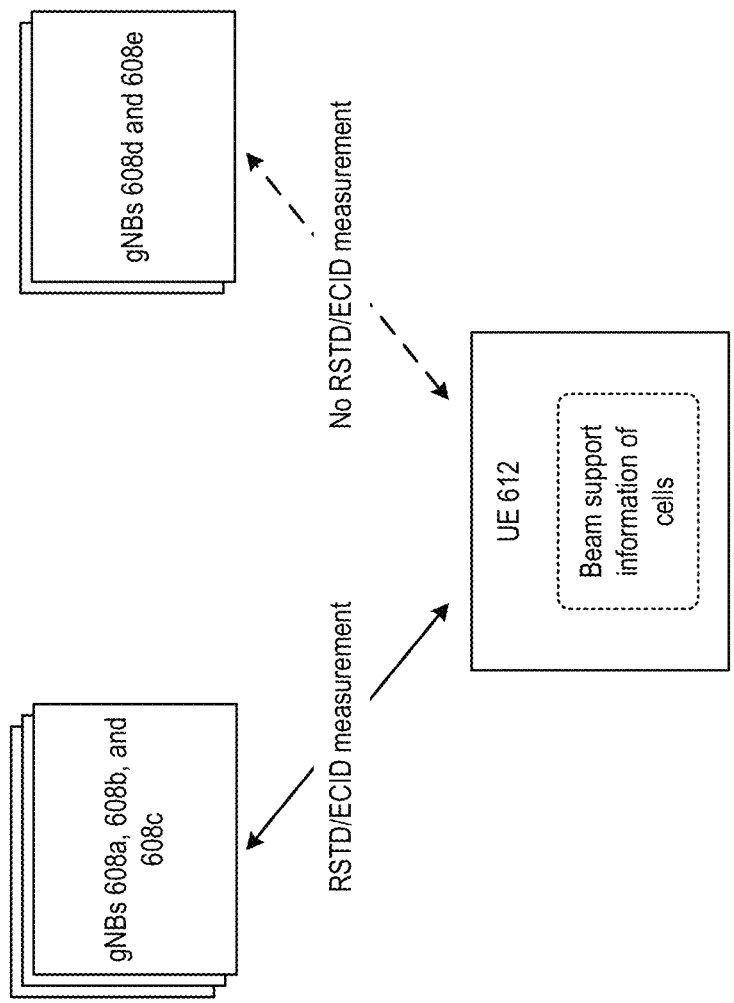

In some examples, UE 612 can cache the beam support information of the cells (e.g., serving cells, neighboring cells, etc.) it has measured in the past and can adapt the location determination operations without further assistance from, for example, location server 602. For example, UE 612 may have received the beam support information from location server 602 and/or SIB1 broadcast from gNBs 608 in the past and cache the beam support information. UE 612 can adapt the location determination operations (e.g., E-CID operations, OTDOA operations, etc.) based on the cached beam support information. For example, as shown in FIG. 7D, based on the cached beam support information, UE 612 can rank the top three cells that support the highest number of radio beams, narrowest radio beams, etc., and select gNBs 608a, 608b, and 608c to perform RSTD and/or ECID measurements, while skipping the measurements with gNBs 608d and 608e.

Figure 8:
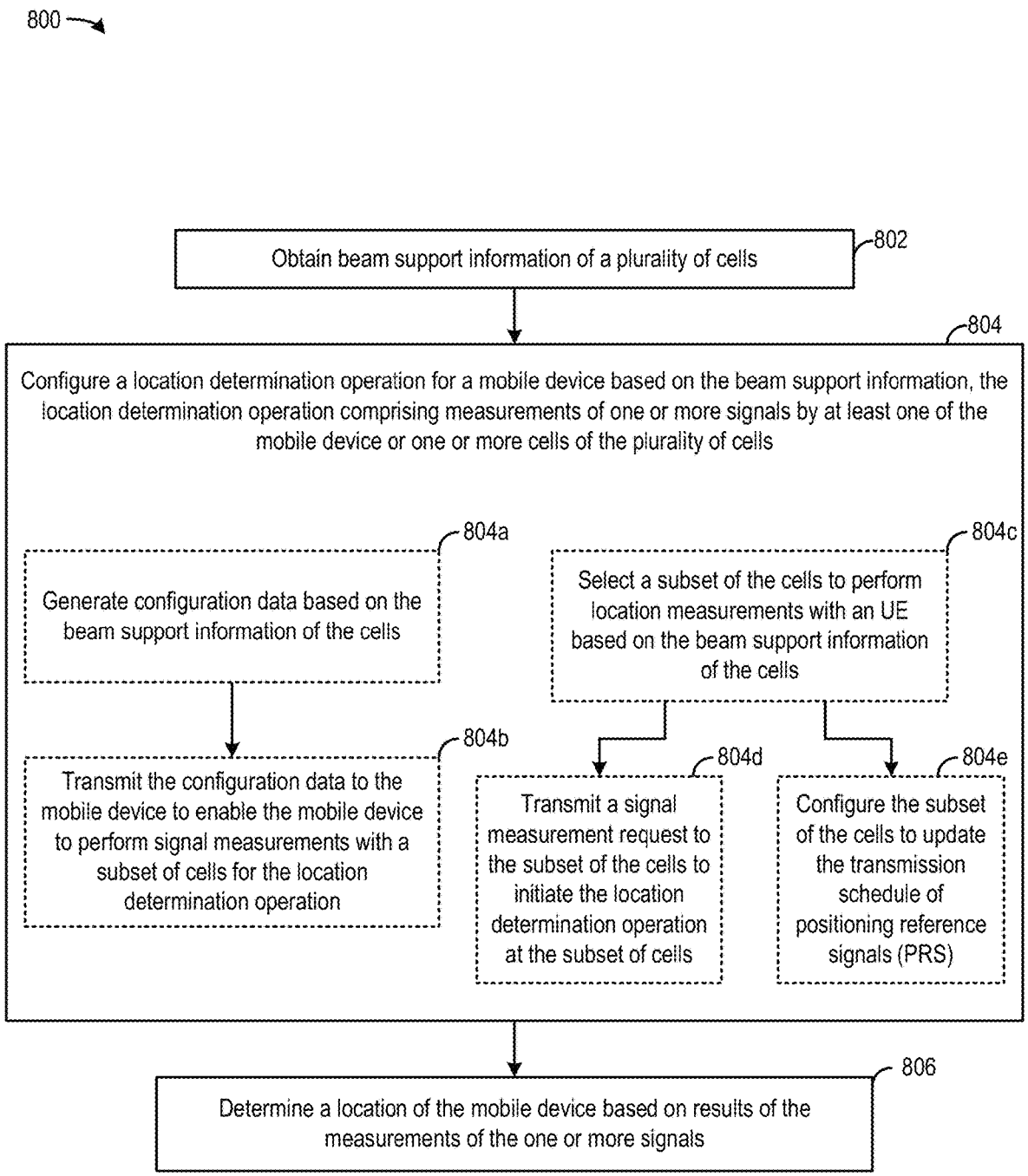
FIG. 8 is a flow diagram illustrating a method of performing location measurement at a location server, according to some embodiments.
Figure 11:
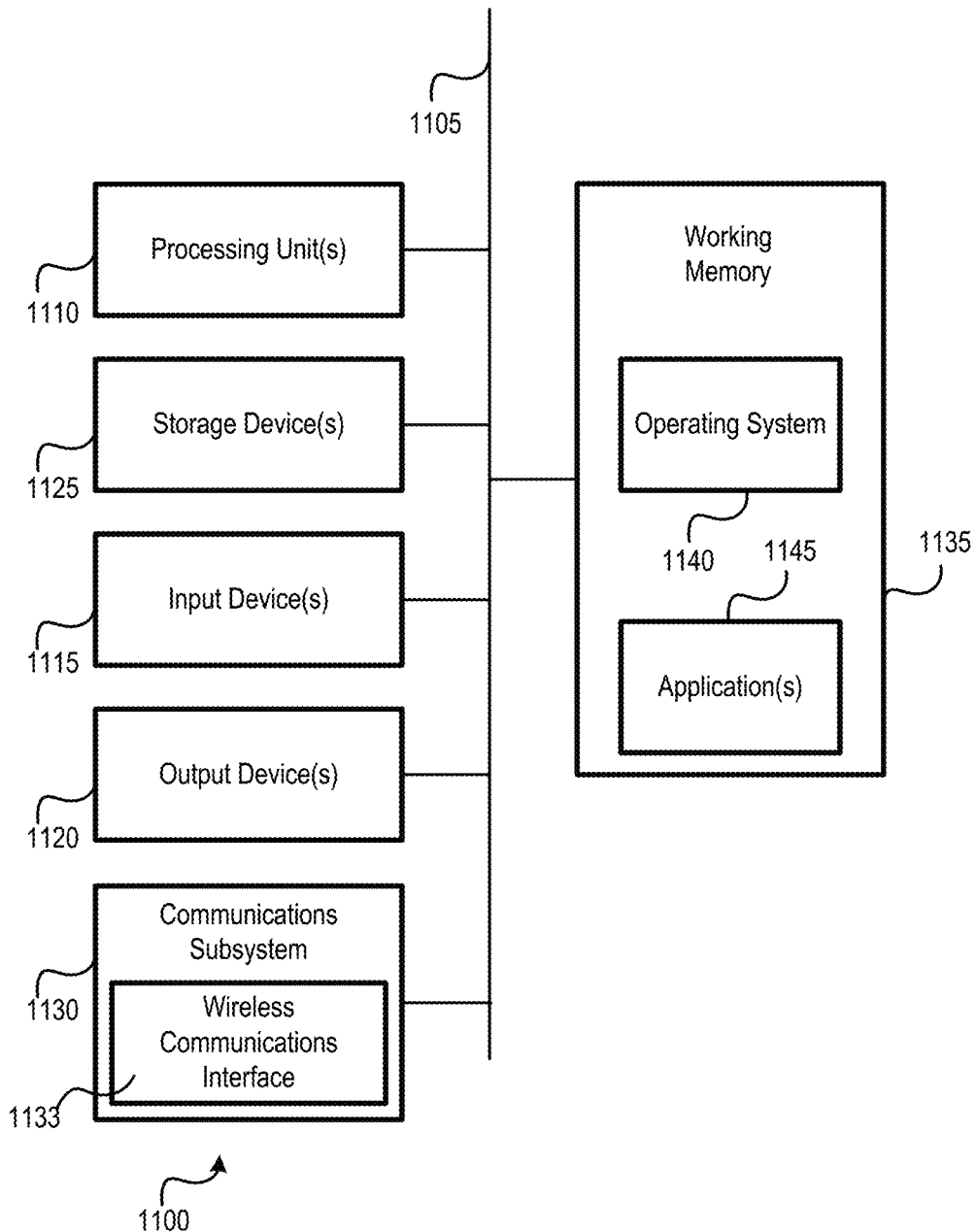
FIG. 11 is an embodiment of a computer system.

FIG. 8 is a flow diagram illustrating a method 800 of performing a location measurement at a location server, according to some embodiments. FIG. 8 illustrates the functionality of a location server according to aspects of embodiments described above. According to some embodiments, functionality of one or more blocks illustrated in FIG. 8 may be performed by a location server (e.g., location server 602). Means for performing these functions may include software and/or hardware components of location server 602, as illustrated in FIG. 11 and described in more detail below.

At block 802, the functionality includes obtaining beam support information of a plurality of cells. There are various ways of obtaining beam support information. For example, the location server can transmit a query to each of a set of base stations (e.g., gNBs 608) using NRPPa procedures to request for the beam support information. In some examples, as part of E-CID Location Information Transfer under the NRPPa procedures, the location server can transmit a message for an E-CID measurement initiation request to each base station to initiate E-CID operations with the base stations, and the message may include an information element (IE) for the beam support information. In some examples, as part of OTDOA Information Transfer under the NRPPa procedures, the location server can transmit a message for an OTDOA information request to the base stations to initiate OTDOA operations with the base stations, and the message may also include an information element (IE) for the beam support information. Means for performing the functions at block 802 may comprise a bus 1105, processing unit(s) 1110, wireless communication interface 1133, memory 1135, and/or other hardware and/or software components of location server 602 as illustrated in FIG. 11 and described in more detail below.

At block 804, the functionality includes configuring a location determination operation for a mobile device based on the beam support information, the location determination operation comprising measurements of one or more signals to be performed by at least one of the mobile device or one or more cells of the plurality of cells and may include, for example, an OTDOA operation, an E-CID operation, etc.

There are various ways by which the location server can configure the location determination operation. In some examples, the location server can generate configuration data (e.g., Assistance Data) based on the beam support information at sub-block 804a. The configuration data may include the number of radio beams supported at each cell, the beam widths of the radio beams supported at each cell, identification of the radio beams supported at each cell, etc. The UE can select the subset of the cells supporting the highest number of beams the UE is likely to receive (e.g., based on the AoAs of the beams, a coarse estimate of the UE's present location, known location of the base station, etc.) among the cells based on the configuration data to perform the signal measurements. The UE may also select the subset of the cells supporting beams with the narrowest beam widths among the cells based on the configuration data to perform the signal measurements. In some examples, the location server can also select the subset of the cells based on the beam support information and include the subset of the cells in the configuration data. The location server can send the configuration data to the mobile device at sub-block 804*b*, to enable the mobile device to perform signal measurements (e.g., PRS signal measurements, E-CID measurements, etc.) with a subset of cells.

In some examples, the location server can select a subset of the cells to perform location measurements with a UE based on the beam support information of the cells, at sub-block 804*c*. In some examples, the location server can transmit a signal measurement request (e.g., an E-CID measurement initiation response message) to the subset of the cells to initiate signal measurements (e.g., RSRP/RSRQ measurement, Timing Advance measurements, etc.) at the subset of cells, at sub-block 804*d*. In some examples, the location server can also configure the subset of the cells to update the transmission schedules of positioning reference signals (PRS) (e.g., by increasing the duration of the signals, reducing the periods between the signals, allocating additional carrier bandwidths to transmit the signals, etc.), as part of "On-Demand PRS" operation, at sub-block 804*e*.

Means for performing the functions at block 804, including sub-blocks 804*a*-804*e*, may comprise bus 1105, processing unit(s) 1110, wireless communication interface 1133, memory 1135, and/or other hardware and/or software components of location server 602 as illustrated in FIG. 11 and described in more detail below.

At block 806, the functionality includes receiving results of the measurements of the one or more signals. The results can be received from, for example, the mobile device (e.g., RSTD measurements) and/or the base stations of the one or more cells (e.g., AoA measurements, RSRP/RSRQ measurement, Timing Advance measurements, etc.). Means for performing the functions at block 806 may comprise bus 1105, processing unit(s) 1110, wireless communication interface 1133, memory 1135, and/or other hardware and/or software components of location server 602 as illustrated in FIG. 11 and described in more detail below.

At block 808, the functionality includes determining a location of the mobile device based on the results of the measurements of the one or more signals, based on the techniques described above in FIG. 3A-FIG. 5B. Means for performing the functions at block 802 may comprise a bus 1105, processing unit(s) 1110, memory 1135, and/or other hardware and/or software components of location server 602 as illustrated in FIG. 11 and described in more detail below.

Figure 9:
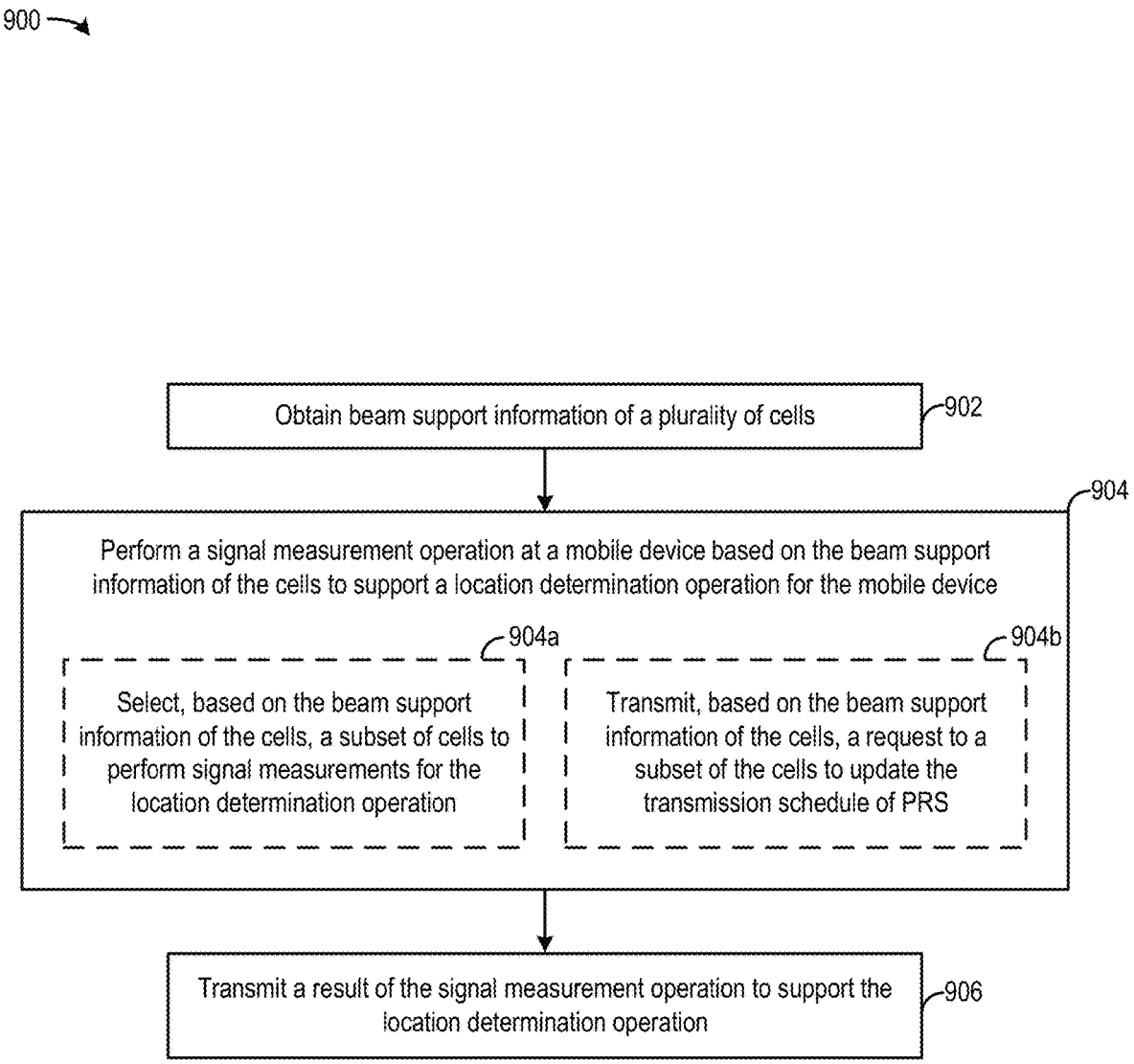
FIG. 9 is a flow diagram illustrating a method of performing location measurement at a mobile device, according to some embodiments.
Figure 10:
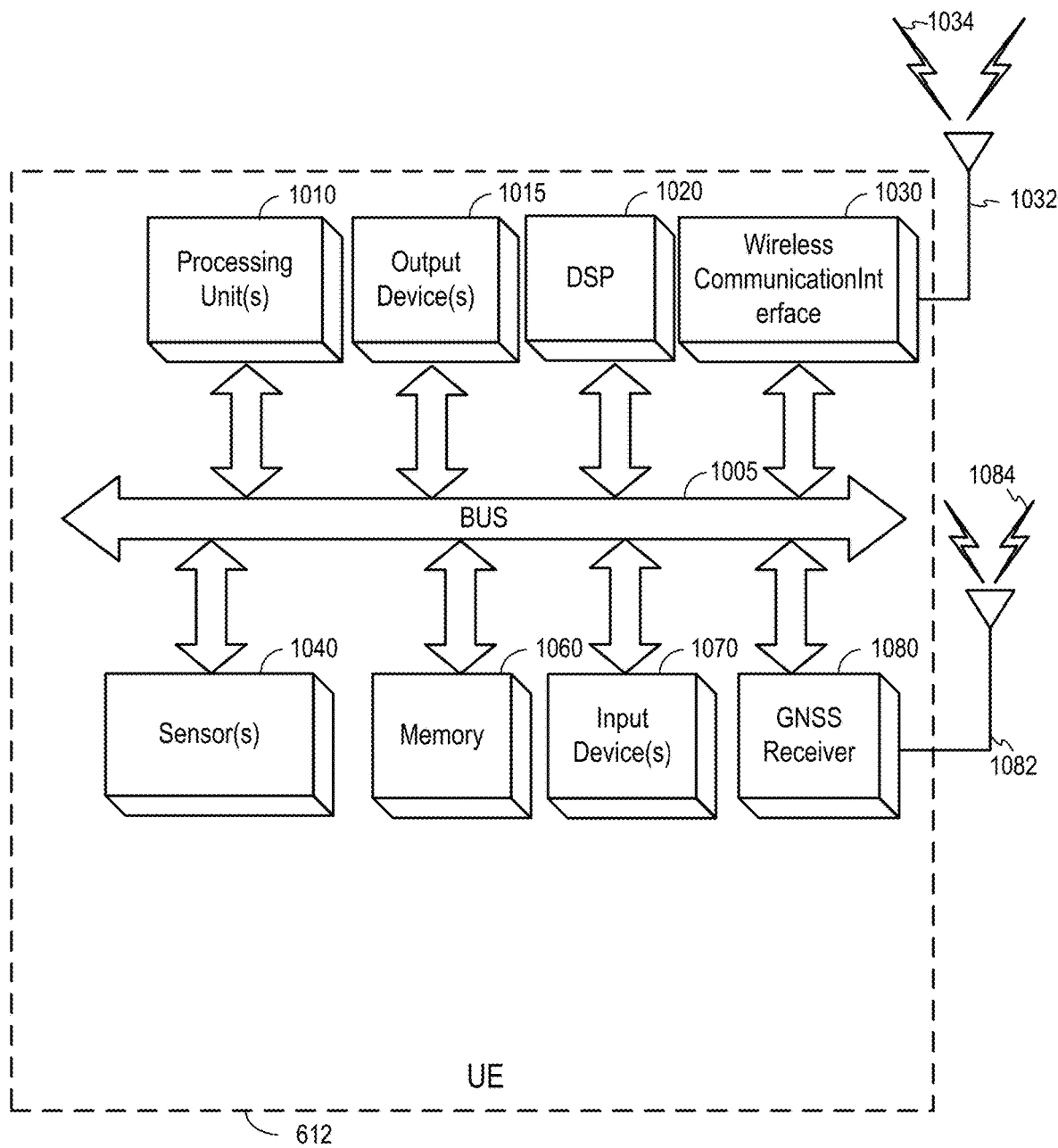
FIG. 10 is an embodiment of a UE.

FIG. 9 is a flow diagram illustrating a method 900 of performing a location measurement at a mobile device (e.g., UE 612), according to some embodiments. FIG. 9 illustrates the functionality of a mobile device according to aspects of embodiments described above. According to some embodiments, functionality of one or more blocks illustrated in FIG. 9 may be performed by a mobile device (e.g., UE 612). Means for performing these functions may include software and/or hardware components of UE 612 as illustrated in FIG. 10 and described in more detail below.

At block 902, the functionality includes obtaining beam support information of a plurality of cells. The mobile device may receive the beam support information may via, for example, configuration data (e.g., Assistance Data) from a location server, SIB1 broadcast and/or RRC Reconfig message from a base station, etc. Means for performing the functions at block 902 may comprise a bus 1005, processing unit(s) 1010, wireless communication interface 1130, memory 1160, and/or other hardware and/or software components of UE 612 as illustrated in FIG. 10 and described in more detail below.

At block 904, the functionality includes performing measurements of one or more signals at the mobile device based on the beam support information of the plurality of cells to support a location determination operation for the mobile device. There are various ways by which the mobile device can perform the measurements based on the beam support information. For example, the mobile device can select a subset of cells to perform the measurements of the one or more signals for the location determination operation, at sub-block 904*a*. Specifically, the mobile device can select the subset of the cells supporting the highest number of beams the mobile device is likely to receive (e.g., based on the AoAs of the beams, a coarse estimate of the mobile device's present location from GPS signals, known location of the base station, etc.) among the cells based on the configuration data to perform the signal measurements. The mobile device may also select the subset of the cells supporting beams with the narrowest beam widths among the cells based on the configuration data to perform the signal measurements. As another example, the mobile device can transmit, based on the beam support information of the cells, a request to the subset of the cells to update the transmission schedule of PRS (e.g., by increasing the duration of the signals, reducing the periods between the signals, allocating additional carrier bandwidths to transmit the signals, etc.), as part of "On-Demand PRS" operation, at sub-block 904*b*. Means for performing the functions at block 904 may comprise bus 1005, processing unit(s) 1010, wireless communication interface 1030, memory 1060, GNSS receiver 1080, and/or other hardware and/or software components of UE 612 as illustrated in FIG. 10 and described in more detail below.

At block 906, the functionality includes transmitting results of the measurements to support the location determination operation. The mobile device may transmit the results to a location server (e.g., OTDOA operation) or to the base station it operates with (e.g., RSRQ and/or RSRP measurements for E-CID operation). Means for performing the functions at block 906 may comprise bus 1005, processing unit(s) 1010, wireless communication interface 1030, memory 1060, GNSS receiver 1080, and/or other hardware and/or software components of UE 612 as illustrated in FIG. 10 and described in more detail below.

FIG. 10 illustrates an embodiment of UE 612 (and UE 105 of FIG. 1), which can be utilized as described herein above (e.g., in association with FIGS. 1-9). For example, UE 612 can perform one or more of the functions of method 900 of FIG. 9. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations (e.g., located at different parts of a user's body, in which case the components may be communicatively connected via a Personal Area Network (PAN) and/or other means).

UE 612 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below). UE 612 also can include one or more input devices 1070, which can include without limitation a touch screen, a touch pad, microphone, button(s), dial(s), switch(es), and/or the like; and one or more output devices 1015, which can include without limitation a display, light emitting diode (LED), speakers, and/or the like.

UE 612 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities, etc.), and/or the like, which may enable to the UE 612/UE 105 to communicate via the networks described above with regard to FIG. 1. The wireless communication interface 1030 may permit data to be communicated with a network, eNBs, gNBs, and/or other network components, computer systems, and/or any other electronic devices described herein. The communication can be carried out via one or more wireless communication antenna(s) 1032 that send and/or receive wireless signals 1034.

Depending on desired functionality, the wireless communication interface 1030 may comprise separate transceivers to communicate with base stations (e.g., eNBs and gNBs) and other terrestrial transceivers, such as wireless devices and access points. UE 612 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. 5G, LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

UE 612 can further include sensor(s) 1040. Such sensors may comprise, without limitation, one or more inertial sensors (e.g., accelerometer(s), gyroscope(s), and or other IMUs), camera(s), magnetometer(s), altimeter(s), microphone(s), proximity sensor(s), light sensor(s), and the like, some of which may be used to complement and/or facilitate the location determination described herein.

Embodiments of UE 612 may also include a GNSS receiver 1080 capable of receiving signals 1084 from one or more GNSS satellites (e.g., SVs 190) using an GNSS antenna 1082. Such positioning can be utilized to complement and/or incorporate the techniques described herein. The GNSS receiver 1080 can extract a location of UE 612, using conventional techniques, from GNSS SVs of a GNSS system, such as Global Positioning System (GPS), Galileo, Glonass, Compass, Quasi-Zenith Satellite System (QZSS) over Japan, Indian Regional Navigational Satellite System (IRNSS) over India, Beidou over China, and/or the like. Moreover, the GNSS receiver 1080 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

UE 612 may further include and/or be in communication with a memory 1060. Memory 1060 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Memory 1060 of the UE 105 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by UE 612 (and/or processing unit(s) 1010 or DSP 1020 within UE 612). In an aspect, then, such code and/or instructions can be used to configure and/or adapt a general purpose computer (or other device) to perform one or more operations in accordance with the described methods.

FIG. 11 illustrates an embodiment of a computer system 1100, which may be utilized and/or incorporated into one or more components of a communication system (e.g., communication system 100 of FIG. 1), including various components a 5G network, including the 5G RAN and 5GC, and/or similar components of other network types, and may include location server 602. FIG. 11 provides a schematic illustration of one embodiment of a computer system 1100 that can perform the methods provided by various other embodiments, such as the method described in relation to FIG. 8. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different physical or geographical locations. In some embodiments, computer system 1100 may correspond to an LMF 120, a gNB 110 (e.g., gNB 110-1), an eNB, an E-SMLC, a SUPL SLP and/or some other type of location-capable device.

Computer system 1100 is shown comprising hardware elements that can be electrically coupled via a bus 1105 (or may otherwise be in communication, as appropriate). The hardware elements may include processing unit(s) 1110, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 9. The computer system 1100 also can include one or more input devices 1115, which can include without limitation a mouse, a keyboard, a camera, a microphone, and/or the like; and one or more output devices 1120, which can include without limitation a display device, a printer, and/or the like.

Computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1100 may also include a communications subsystem 1130, which can include support of wireline communication technologies and/or wireless communication technologies (in some embodiments) managed and controlled by a wireless communication interface 1133. The communications subsystem 1130 may include a modem, a network card (wireless or wired), an infrared communication device, a wireless communication device, and/or a chipset, and/or the like. The communications subsystem 1130 may include one or more input and/or output communication interfaces, such as the wireless communication interface 1133, to permit data to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, computer system 1100 will further comprise a working memory 1135, which can include a RAM and/or or ROM device. Software elements, shown as being located within the working memory 1135, can include an operating system 1140, device drivers, executable libraries, and/or other code, such as application(s) 1145, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 8, may be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

The invention claimed is:

1. A mobile device, comprising:
    a memory;
    a wireless communication interface; and
    a hardware processor, communicatively connected to the memory and the wireless communication interface, the hardware processor configured to:
        obtain beam support information of a plurality of cells, wherein the beam support information comprises a number of beams supported by at least one of the plurality of cells;
        perform measurements of one or more signals at the mobile device based on the beam support information of the plurality of cells to support a location determination operation for the mobile device; and
        transmit results of the measurements of the one or more signals to at least one of a location server or to a base station to support the location determination operation.

2. The mobile device of claim 1, wherein the beam support information further comprises at least one of: number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles.

3. The mobile device of claim 2, wherein the information to identify each beam of the number of beams supported at the each cell comprises a bitmap;
    wherein each bit of the bitmap corresponds to a beam; and
    wherein a value of the each bit indicates whether the beam is supported at the each cell.

4. The mobile device of claim 1, wherein the beam support information is obtained from configuration data provided from the location server.

5. The mobile device of claim 4, wherein the configuration data identifies a subset of cells of the plurality of cells which support beams that are targeted at a location of the mobile device.

6. The mobile device of claim 4, wherein the configuration data includes information of the subset of cells.

7. The mobile device of claim 4, wherein the configuration data includes the beam support information of each cell of the plurality of cells.

8. The mobile device of claim 4, wherein the configuration data includes Assistance Data.

9. The mobile device of claim 1, wherein the beam support information is obtained from base stations of the plurality of cells.

10. The mobile device of claim 9, wherein the beam support information is obtained by the location server from the base stations based on a query transmitted under New Radio Location Protocol A (NRPPa) protocol.

11. The mobile device of claim 9, wherein the beam support information is obtained by the location server from the base stations based on an information request.

12. The mobile device of claim 11, wherein the information request includes a list of information items, one of the list of information items including the beam support information.

13. The mobile device of claim 1, wherein the beam support information is obtained from at least one of: a maintenance operation of the location server, or a programming operation of the location server.

14. The mobile device of claim 1, wherein the beam support information is obtained via at least one of: Radio Resource Control (RRC) Reconfiguration messages from the plurality of cells, or System Information Block Type 1 (SIB1) messages from the plurality of cells.

15. The mobile device of claim 1, wherein the hardware processor is further configured to:
    select, based on the beam support information, a subset of cells of the plurality of cells; and perform the measurements of the one or more signals with the subset of cells.

16. The mobile device of claim 1, wherein the measurements of the one or more signals comprise at least one of: measurements of Positioning Reference Signals (PRS), measurements of Reference Signal Received Power (RSRP), measurements of Reference Signal Received Quality (RSRQ), Timing Advance, or Angle of Arrival (AoA).

17. The mobile device of claim 1, wherein the hardware processor is further configured to:
   select, based on the beam support information, a subset of cells of the plurality of cells; and
   transmit a request to the subset of cells to update a schedule of PRS transmission at the subset of cells.

18. The mobile device of claim 17, wherein updating a schedule of PRS transmission at the subset of cells comprises at least one of: updating a duration of each PRS signal, updating a period between the each PRS signal, or updating a bandwidth allocated for the each PRS signal.

19. The mobile device of claim 17, wherein the subset of cells supports a highest number of beams among the plurality of cells.

20. The mobile device of claim 17, wherein the subset of cells supports narrowest beams among the plurality of cells.

21. A method comprising:
   obtaining, by a mobile device, beam support information of a plurality of cells, wherein the beam support information comprises a number of beams supported by at least one of the plurality of cells;
   performing, by the mobile device, measurements of one or more signals at the mobile device based on the beam support information of the plurality of cells to support a location determination operation for the mobile device; and
   transmitting, by the mobile device, results of the measurements of the one or more signals to at least one of a location server or to a base station to support the location determination operation.

22. The method of claim 21, wherein the beam support information further comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles.

23. The method of claim 22, wherein the information to identify each beam of the number of beams supported at the each cell comprises a bitmap;
   wherein each bit of the bitmap corresponds to a beam; and
   wherein a value of the each bit indicates whether the beam is supported at the each cell.

24. The method of claim 21, wherein the beam support information is obtained from configuration data provided from the location server.

25. The method of claim 24, wherein the configuration data identifies a subset of cells of the plurality of cells which support beams that are targeted at a location of the mobile device;
   wherein the subset of cells supports at least one of: a highest number of beams among the plurality of cells, or narrowest beams among the plurality of cells.

26. A non-transitory computer-readable medium storing instructions that, when executed by a hardware processor of a mobile device, cause the mobile device to:
   obtain beam support information of a plurality of cells, wherein the beam support information comprises a number of beams supported by at least one of the plurality of cells;
   perform measurements of one or more signals at the mobile device based on the beam support information of the plurality of cells to support a location determination operation for the mobile device; and
   transmit results of the measurements of the one or more signals to at least one of a location server or to a base station to support the location determination operation.

27. The non-transitory computer readable medium of claim 26, wherein the beam support information further comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles.

28. The non-transitory computer readable medium of claim 27, wherein the information to identify each beam of the number of beams supported at the each cell comprises a bitmap;
   wherein each bit of the bitmap corresponds to a beam; and
   wherein a value of the each bit indicates whether the beam is supported at the each cell.

29. The non-transitory computer readable medium of claim 26, wherein the beam support information is obtained via at least one of: Radio Resource Control (RRC) Reconfiguration messages from the plurality of cells, or System Information Block Type 1 (SIB1) messages from the plurality of cells.

30. An apparatus, comprising:
   means for obtaining beam support information of a plurality of cells, wherein the beam support information comprises a number of beams supported by at least one of the plurality of cells;
   means for performing measurements of one or more signals at the apparatus based on the beam support information of the plurality of cells to support a location determination operation for the apparatus; and
   means for transmitting results of the measurements of the one or more signals to at least one of a location server or to a base station to support the location determination operation.

31. The apparatus of claim 30, wherein the beam support information further comprises at least one of: a number of beams supported at each cell of the plurality of cells, information to identify each beam of the number of beams supported at the each cell, beam width information of the each beam, or Positioning reference Signals (PRS) codebook information which encapsulates the beams which are enabled along various elevation and azimuth angles.

* * * * *